(12) United States Patent
Plagemann et al.

(10) Patent No.: US 9,857,868 B2
(45) Date of Patent: Jan. 2, 2018

(54) METHOD AND SYSTEM FOR ERGONOMIC TOUCH-FREE INTERFACE

(75) Inventors: Christian Plagemann, Menlo Park, CA (US); Hendrik Dahlkamp, Palo Alto, CA (US); Hariraam Varun Ganapathi, Palo Alto, CA (US); Sebastian Thrun, Los Altos Hills, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 137 days.

(21) Appl. No.: 13/052,050

(22) Filed: Mar. 19, 2011

(65) Prior Publication Data

US 2012/0235904 A1 Sep. 20, 2012

(51) Int. Cl.
| | | |
|---|---|---|
| *G06F 3/01* | (2006.01) | |
| *G06F 3/03* | (2006.01) | |
| *G06F 3/0481* | (2013.01) | |

(52) U.S. Cl.
CPC ............... *G06F 3/011* (2013.01); *G06F 3/017* (2013.01); *G06F 3/0304* (2013.01); *G06F 3/04815* (2013.01)

(58) Field of Classification Search
CPC ........ G06F 3/011; G06F 3/017; G06F 3/0304; G06K 9/00335; G06K 9/00369;
(Continued)

(56) References Cited

U.S. PATENT DOCUMENTS

| | | | |
|---|---|---|---|
| 5,454,043 A | | 9/1995 | Freeman et al. |
| 5,594,469 A | * | 1/1997 | Freeman et al. .............. 345/158 |

(Continued)

FOREIGN PATENT DOCUMENTS

| | | |
|---|---|---|
| WO | 9749262 A1 | 12/1997 |
| WO | 2005091125 A2 | 9/2005 |

(Continued)

OTHER PUBLICATIONS

Guillaume Dewaele, "Hand Motion from 3D Point Trajectories and a Smooth Surface Model", 2004, Springer Verlag Berlin, pp. 495-507.*

(Continued)

*Primary Examiner* — Koosha Sharifi-Tafreshi
(74) *Attorney, Agent, or Firm* — KPPB LLP

(57) ABSTRACT

With the advent of touch-free interfaces such as described in the present disclosure, it is no longer necessary for computer interfaces to be in predefined locations (e.g., desktops) or configuration (e.g., rectangular keyboard). The present invention makes use of touch-free interfaces to encourage users to interface with a computer in an ergonomically sound manner. Among other things, the present invention implements a system for localizing human body parts such as hands, arms, shoulders, or even the fully body, with a processing device such as a computer along with a computer display to provide visual feedback on the display that encourages a user to maintain an ergonomically preferred position with ergonomically preferred motions. For example, the present invention encourages a user to maintain his motions within an ergonomically preferred range without have to reach out excessively or repetitively.

13 Claims, 18 Drawing Sheets

(58) Field of Classification Search
CPC .......... G06T 15/00; G06T 2207/30196; G06T 2207/10028
USPC ................ 345/156, 158, 173–175; 715/863; 382/103, 173, 181, 190
See application file for complete search history.

(56) References Cited

U.S. PATENT DOCUMENTS

| | | | |
|---|---|---|---|
| 5,852,672 A | 12/1998 | Lu | |
| 6,072,494 A * | 6/2000 | Nguyen .................. | 715/863 |
| 6,191,773 B1 | 2/2001 | Maruno et al. | |
| 6,222,465 B1 * | 4/2001 | Kumar et al. .................. | 341/20 |
| 6,323,942 B1 | 11/2001 | Bamji | |
| 6,480,373 B1 | 11/2002 | Youens et al. | |
| 6,512,838 B1 | 1/2003 | Rafii et al. | |
| 6,515,740 B2 | 2/2003 | Bamji et al. | |
| 6,522,395 B1 | 2/2003 | Bamji et al. | |
| 6,580,496 B2 | 6/2003 | Bamji et al. | |
| 6,587,186 B2 | 7/2003 | Bamji et al. | |
| 6,614,422 B1 | 9/2003 | Rafii et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,690,618 B2 | 2/2004 | Tomasi et al. | |
| 6,710,770 B2 | 3/2004 | Tomasi et al. | |
| 6,778,699 B1 | 8/2004 | Gallagher | |
| 6,834,120 B1 | 12/2004 | LeClerc et al. | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 6,944,315 B1 | 9/2005 | Zipperer et al. | |
| 7,006,236 B2 | 2/2006 | Tomasi et al. | |
| 7,031,525 B2 | 4/2006 | Beardsley | |
| 7,038,659 B2 | 5/2006 | Rajkowski | |
| 7,050,177 B2 | 5/2006 | Tomasi et al. | |
| 7,151,530 B2 | 12/2006 | Roeber et al. | |
| 7,157,685 B2 | 1/2007 | Bamji et al. | |
| 7,173,230 B2 | 2/2007 | Charbon | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,225,414 B1 * | 5/2007 | Sharma et al. ............... | 715/863 |
| 7,227,526 B2 | 6/2007 | Hildreth et al. | |
| 7,274,800 B2 | 9/2007 | Nefian et al. | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,433,029 B1 | 10/2008 | Hsu | |
| 7,450,220 B2 | 11/2008 | O'Connor et al. | |
| 7,464,351 B2 | 12/2008 | Bamji et al. | |
| 7,471,376 B2 | 12/2008 | Bamji et al. | |
| D586,798 S | 2/2009 | Tanaka et al. | |
| 7,507,947 B2 | 3/2009 | Bamji et al. | |
| 7,511,801 B1 | 3/2009 | Rafii et al. | |
| 7,519,201 B2 | 4/2009 | Yang et al. | |
| 7,526,120 B2 | 4/2009 | Gokturk et al. | |
| D599,566 S | 9/2009 | Chu | |
| D602,935 S | 10/2009 | Kettula et al. | |
| 7,620,425 B2 | 11/2009 | Ju et al. | |
| 7,636,150 B1 | 12/2009 | McCauley et al. | |
| 7,653,833 B1 | 1/2010 | Miller et al. | |
| 7,653,883 B2 | 1/2010 | Hotelling et al. | |
| 7,665,041 B2 | 2/2010 | Wilson et al. | |
| D614,616 S | 4/2010 | Denhez et al. | |
| 7,719,662 B2 | 5/2010 | Bamji et al. | |
| 7,741,961 B1 | 6/2010 | Rafii et al. | |
| D621,824 S | 8/2010 | Andre et al. | |
| 7,791,715 B1 | 9/2010 | Bamji | |
| 7,805,003 B1 | 9/2010 | Cohen et al. | |
| 7,877,707 B2 | 1/2011 | Westerman et al. | |
| 7,936,449 B1 | 5/2011 | Bamji et al. | |
| 7,994,465 B1 | 8/2011 | Bamji et al. | |
| 8,009,865 B2 | 8/2011 | Kim et al. | |
| 8,009,871 B2 | 8/2011 | Rafii et al. | |
| D645,493 S | 9/2011 | Zhao | |
| 8,086,971 B2 | 12/2011 | Radivojevic et al. | |
| 8,134,637 B2 | 3/2012 | Rossbach | |
| 8,139,141 B2 | 3/2012 | Bamji et al. | |
| 8,139,142 B2 | 3/2012 | Bamji et al. | |
| 8,175,412 B2 | 5/2012 | Basri et al. | |
| 8,179,604 B1 | 5/2012 | Prada Gomez et al. | |
| 8,180,114 B2 | 5/2012 | Nishihara et al. | |
| 8,187,097 B1 | 5/2012 | Zhang | |
| 8,194,233 B2 | 6/2012 | Bamji | |
| 8,203,699 B2 | 6/2012 | Bamji et al. | |
| 8,212,859 B2 | 7/2012 | Tang et al. | |
| 8,232,990 B2 | 7/2012 | King et al. | |
| D667,827 S | 9/2012 | Park et al. | |
| 8,265,350 B2 | 9/2012 | Torii et al. | |
| 8,274,535 B2 | 9/2012 | Hildreth et al. | |
| 8,314,924 B2 | 11/2012 | Bamji et al. | |
| 8,339,359 B2 | 12/2012 | Hsieh et al. | |
| 8,363,212 B2 | 1/2013 | Bamji et al. | |
| 8,368,795 B2 | 2/2013 | Lo et al. | |
| D677,661 S | 3/2013 | Hirano et al. | |
| D682,272 S | 5/2013 | Kim et al. | |
| 8,462,132 B2 | 6/2013 | Ren et al. | |
| 8,483,489 B2 | 7/2013 | Van Beek et al. | |
| 8,525,876 B2 | 9/2013 | Fan et al. | |
| 8,539,359 B2 | 9/2013 | Rapaport et al. | |
| D692,425 S | 10/2013 | Kubota et al. | |
| 8,552,983 B2 | 10/2013 | Chiu | |
| 8,587,773 B2 | 11/2013 | Bamji et al. | |
| 8,589,033 B2 | 11/2013 | Rafii et al. | |
| 8,602,887 B2 | 12/2013 | Tardif et al. | |
| 8,615,108 B1 | 12/2013 | Stoppa et al. | |
| 8,625,846 B2 | 1/2014 | Dahl | |
| 8,643,701 B2 | 2/2014 | Nguyen et al. | |
| 8,655,021 B2 | 2/2014 | Dal Mutto et al. | |
| 8,666,115 B2 | 3/2014 | Perski et al. | |
| 8,675,182 B2 | 3/2014 | Bamji | |
| 8,681,124 B2 | 3/2014 | Bamji et al. | |
| 8,686,943 B1 | 4/2014 | Rafii | |
| 8,693,724 B2 | 4/2014 | Ahmed et al. | |
| 8,773,512 B1 | 7/2014 | Rafii | |
| 8,787,663 B2 | 7/2014 | Litvak et al. | |
| 8,818,027 B2 | 8/2014 | Forutanpour et al. | |
| 8,824,737 B2 | 9/2014 | Gurman et al. | |
| 8,830,312 B2 | 9/2014 | Hummel et al. | |
| 8,836,768 B1 | 9/2014 | Rafii et al. | |
| 8,840,466 B2 | 9/2014 | Kareemi et al. | |
| 8,854,433 B1 | 10/2014 | Rafii | |
| 8,934,675 B2 | 1/2015 | Dal et al. | |
| 8,941,588 B2 | 1/2015 | Minnen | |
| 2002/0112095 A1 | 8/2002 | Ford et al. | |
| 2002/0140633 A1 | 10/2002 | Rafii et al. | |
| 2003/0021032 A1 | 1/2003 | Bamji et al. | |
| 2003/0132921 A1 | 7/2003 | Torunoglu et al. | |
| 2003/0132950 A1 | 7/2003 | Surucu et al. | |
| 2003/0165048 A1 | 9/2003 | Bamji et al. | |
| 2003/0169906 A1 | 9/2003 | Gokturk et al. | |
| 2003/0172375 A1 | 9/2003 | Shaw et al. | |
| 2003/0174125 A1 | 9/2003 | Torunoglu et al. | |
| 2003/0228032 A1 * | 12/2003 | Rui .................... | G06K 9/00234 |
| | | | 382/103 |
| 2004/0046744 A1 | 3/2004 | Rafii et al. | |
| 2004/0066500 A1 | 4/2004 | Gokturk et al. | |
| 2004/0170323 A1 | 9/2004 | Cootes et al. | |
| 2004/0189720 A1 * | 9/2004 | Wilson et al. ................ | 345/863 |
| 2005/0134853 A1 | 6/2005 | Ingleson et al. | |
| 2005/0238229 A1 | 10/2005 | Ishidera | |
| 2005/0271279 A1 | 12/2005 | Fujimura et al. | |
| 2006/0187214 A1 | 8/2006 | Gillespie et al. | |
| 2006/0197753 A1 | 9/2006 | Hotelling | |
| 2006/0241371 A1 | 10/2006 | Rafii et al. | |
| 2006/0272436 A1 | 12/2006 | Lein et al. | |
| 2007/0057946 A1 | 3/2007 | Albeck et al. | |

(56) References Cited

U.S. PATENT DOCUMENTS

| | | |
|---|---|---|
| 2007/0120834 A1* | 5/2007 | Boillot .......................... 345/173 |
| 2007/0237357 A1* | 10/2007 | Low ........................ G01S 3/781 |
| | | 382/103 |
| 2007/0299631 A1 | 12/2007 | Macbeth et al. |
| 2008/0059390 A1 | 3/2008 | Cox et al. |
| 2008/0120577 A1 | 5/2008 | Ma et al. |
| 2008/0281523 A1 | 11/2008 | Dahl et al. |
| 2009/0021489 A1 | 1/2009 | Westerman et al. |
| 2009/0058829 A1* | 3/2009 | Kim et al. .................... 345/173 |
| 2009/0077161 A1 | 3/2009 | Hamilton, II et al. |
| 2009/0079813 A1* | 3/2009 | Hildreth ................ H04N 7/147 |
| | | 348/14.03 |
| 2009/0096746 A1 | 4/2009 | Kruse et al. |
| 2009/0103780 A1 | 4/2009 | Nishihara et al. |
| 2009/0110301 A1 | 4/2009 | Schopp et al. |
| 2009/0153671 A1 | 6/2009 | Lee et al. |
| 2009/0183125 A1* | 7/2009 | Magal et al. .................. 715/863 |
| 2009/0228841 A1 | 9/2009 | Hildreth |
| 2009/0290811 A1 | 11/2009 | Imai |
| 2009/0307658 A1 | 12/2009 | Freitas et al. |
| 2010/0027845 A1 | 2/2010 | Kim et al. |
| 2010/0027846 A1 | 2/2010 | Xu et al. |
| 2010/0027892 A1 | 2/2010 | Guan et al. |
| 2010/0053151 A1 | 3/2010 | Marti et al. |
| 2010/0060722 A1* | 3/2010 | Bell ........................ G06F 3/017 |
| | | 348/51 |
| 2010/0110384 A1 | 5/2010 | Maekawa |
| 2010/0124949 A1 | 5/2010 | Demuynck et al. |
| 2010/0125815 A1* | 5/2010 | Wang ..................... G06F 3/017 |
| | | 715/856 |
| 2010/0156676 A1 | 6/2010 | Mooring et al. |
| 2010/0192109 A1 | 7/2010 | Westerman et al. |
| 2010/0199228 A1 | 8/2010 | Latta et al. |
| 2010/0202663 A1 | 8/2010 | Kim et al. |
| 2010/0207874 A1 | 8/2010 | Yuxin et al. |
| 2010/0208038 A1 | 8/2010 | Kutliroff et al. |
| 2010/0211920 A1 | 8/2010 | Westerman et al. |
| 2010/0214267 A1* | 8/2010 | Radivojevic .......... G06F 1/1616 |
| | | 345/175 |
| 2010/0229125 A1 | 9/2010 | Cha |
| 2010/0235786 A1 | 9/2010 | Maizels et al. |
| 2010/0265175 A1* | 10/2010 | Kabasawa .............. G06F 3/0346 |
| | | 345/159 |
| 2010/0265316 A1 | 10/2010 | Sali et al. |
| 2010/0271511 A1 | 10/2010 | Ma et al. |
| 2010/0278384 A1* | 11/2010 | Shotton .............. G06K 9/00335 |
| | | 382/103 |
| 2010/0284082 A1 | 11/2010 | Shpunt et al. |
| 2010/0296368 A1 | 11/2010 | Dahl et al. |
| 2010/0306714 A1 | 12/2010 | Latta et al. |
| 2010/0321389 A1 | 12/2010 | Gay et al. |
| 2010/0329511 A1 | 12/2010 | Yoon et al. |
| 2011/0007079 A1* | 1/2011 | Perez et al. .................... 345/473 |
| 2011/0025827 A1 | 2/2011 | Shpunt et al. |
| 2011/0052006 A1 | 3/2011 | Gurman et al. |
| 2011/0069389 A1 | 3/2011 | Shpunt |
| 2011/0074675 A1 | 3/2011 | Shiming et al. |
| 2011/0075259 A1 | 3/2011 | Shpunt |
| 2011/0096954 A1 | 4/2011 | Dahl |
| 2011/0103448 A1 | 5/2011 | Dahl et al. |
| 2011/0114857 A1 | 5/2011 | Akerman et al. |
| 2011/0115892 A1 | 5/2011 | Fan et al. |
| 2011/0134036 A1 | 6/2011 | Suggs |
| 2011/0134114 A1 | 6/2011 | Rais et al. |
| 2011/0148798 A1 | 6/2011 | Dahl |
| 2011/0149044 A1 | 6/2011 | Snin |
| 2011/0158508 A1 | 6/2011 | Shpunt et al. |
| 2011/0164032 A1 | 7/2011 | Shadmi |
| 2011/0173574 A1 | 7/2011 | Clavin et al. |
| 2011/0185309 A1* | 7/2011 | Challinor et al. ............. 715/784 |
| 2011/0187878 A1 | 8/2011 | Mor et al. |
| 2011/0188054 A1 | 8/2011 | Petronius et al. |
| 2011/0193939 A1* | 8/2011 | Vassigh et al. ................ 348/46 |
| 2011/0197161 A1 | 8/2011 | Mattingly et al. |
| 2011/0205421 A1 | 8/2011 | Shpunt et al. |
| 2011/0210931 A1 | 9/2011 | Shai |
| 2011/0211044 A1 | 9/2011 | Shpunt et al. |
| 2011/0211073 A1 | 9/2011 | Foster |
| 2011/0211754 A1* | 9/2011 | Litvak ................ G06K 9/00375 |
| | | 382/165 |
| 2011/0219340 A1 | 9/2011 | Pathangay et al. |
| 2011/0221974 A1 | 9/2011 | Stern et al. |
| 2011/0222726 A1 | 9/2011 | Ruan |
| 2011/0243380 A1 | 10/2011 | Forutanpour et al. |
| 2011/0254762 A1 | 10/2011 | Dahl et al. |
| 2011/0254765 A1 | 10/2011 | Brand |
| 2011/0262006 A1 | 10/2011 | Nakano |
| 2011/0267456 A1 | 11/2011 | Adermann |
| 2011/0274357 A1 | 11/2011 | Iwamoto et al. |
| 2011/0286673 A1 | 11/2011 | Givon et al. |
| 2011/0289455 A1 | 11/2011 | Reville et al. |
| 2011/0291925 A1 | 12/2011 | Israel et al. |
| 2011/0291926 A1 | 12/2011 | Gokturk et al. |
| 2011/0291988 A1 | 12/2011 | Bamji et al. |
| 2011/0292036 A1 | 12/2011 | Sali et al. |
| 2011/0292181 A1 | 12/2011 | Acharya et al. |
| 2011/0292370 A1 | 12/2011 | Hills et al. |
| 2011/0292380 A1 | 12/2011 | Bamji |
| 2011/0293137 A1 | 12/2011 | Gurman et al. |
| 2011/0294574 A1 | 12/2011 | Yamada et al. |
| 2011/0295562 A1 | 12/2011 | Mehta et al. |
| 2011/0296353 A1 | 12/2011 | Ahmed et al. |
| 2011/0298704 A1 | 12/2011 | Krah |
| 2011/0300929 A1 | 12/2011 | Tardif et al. |
| 2011/0304541 A1 | 12/2011 | Dalal |
| 2011/0310010 A1 | 12/2011 | Hoffnung et al. |
| 2011/0310125 A1 | 12/2011 | Mceldowney et al. |
| 2012/0011454 A1 | 1/2012 | Droz et al. |
| 2012/0027252 A1 | 2/2012 | Liu et al. |
| 2012/0038986 A1 | 2/2012 | Pesach |
| 2012/0042150 A1 | 2/2012 | Saar |
| 2012/0042246 A1 | 2/2012 | Schwesinger et al. |
| 2012/0050488 A1 | 3/2012 | Cohen et al. |
| 2012/0051605 A1 | 3/2012 | Nagar et al. |
| 2012/0069168 A1 | 3/2012 | Huang et al. |
| 2012/0070070 A1 | 3/2012 | Litvak |
| 2012/0072939 A1 | 3/2012 | Crenshaw |
| 2012/0078614 A1 | 3/2012 | Galor et al. |
| 2012/0088581 A1 | 4/2012 | Mao et al. |
| 2012/0092304 A1 | 4/2012 | Katz |
| 2012/0099403 A1 | 4/2012 | Dahl et al. |
| 2012/0106792 A1 | 5/2012 | Kang et al. |
| 2012/0124604 A1 | 5/2012 | Small et al. |
| 2012/0127070 A1 | 5/2012 | Ryoo et al. |
| 2012/0139835 A1 | 6/2012 | Morrison et al. |
| 2012/0140094 A1 | 6/2012 | Shpunt et al. |
| 2012/0140109 A1 | 6/2012 | Shpunt et al. |
| 2012/0169583 A1 | 7/2012 | Rippel et al. |
| 2012/0169671 A1 | 7/2012 | Yasutake |
| 2012/0176414 A1 | 7/2012 | Givon |
| 2012/0182464 A1 | 7/2012 | Shpunt et al. |
| 2012/0202569 A1 | 8/2012 | Maizels et al. |
| 2012/0204133 A1 | 8/2012 | Guendelman et al. |
| 2012/0204202 A1 | 8/2012 | Rowley et al. |
| 2012/0206339 A1 | 8/2012 | Dahl |
| 2012/0218183 A1 | 8/2012 | Givon et al. |
| 2012/0223882 A1 | 9/2012 | Galor et al. |
| 2012/0243374 A1 | 9/2012 | Dahl et al. |
| 2012/0249744 A1 | 10/2012 | Pesach et al. |
| 2012/0268364 A1 | 10/2012 | Minnen |
| 2012/0270653 A1 | 10/2012 | Kareemi et al. |
| 2012/0274550 A1 | 11/2012 | Campbell et al. |
| 2012/0274610 A1 | 11/2012 | Dahl |
| 2012/0280900 A1* | 11/2012 | Wang ................... G06F 3/0488 |
| | | 345/156 |
| 2012/0281240 A1 | 11/2012 | Cohen et al. |
| 2012/0299820 A1 | 11/2012 | Dahl |
| 2012/0304067 A1 | 11/2012 | Han et al. |
| 2012/0306876 A1 | 12/2012 | Shotton et al. |
| 2012/0309532 A1 | 12/2012 | Ambrus et al. |
| 2012/0313848 A1 | 12/2012 | Galor et al. |
| 2012/0313900 A1 | 12/2012 | Dahl |
| 2012/0327125 A1 | 12/2012 | Kutliroff et al. |

(56) References Cited

U.S. PATENT DOCUMENTS

| | | |
|---|---|---|
| 2013/0014052 A1 | 1/2013 | Frey et al. |
| 2013/0038601 A1 | 2/2013 | Han et al. |
| 2013/0038881 A1 | 2/2013 | Pesach et al. |
| 2013/0038941 A1 | 2/2013 | Pesach et al. |
| 2013/0044053 A1 | 2/2013 | Galor et al. |
| 2013/0050080 A1 | 2/2013 | Dahl et al. |
| 2013/0055120 A1 | 2/2013 | Galor et al. |
| 2013/0055143 A1 | 2/2013 | Martin et al. |
| 2013/0055150 A1 | 2/2013 | Galor |
| 2013/0057654 A1 | 3/2013 | Rafii et al. |
| 2013/0063487 A1 | 3/2013 | Spiegel et al. |
| 2013/0069876 A1 | 3/2013 | Cheng et al. |
| 2013/0094329 A1 | 4/2013 | Dahl et al. |
| 2013/0106692 A1 | 5/2013 | Maizels et al. |
| 2013/0107021 A1 | 5/2013 | Maizels et al. |
| 2013/0135312 A1 | 5/2013 | Yang et al. |
| 2013/0147770 A1 | 6/2013 | Dahl et al. |
| 2013/0155031 A1 | 6/2013 | Dahl et al. |
| 2013/0162527 A1 | 6/2013 | Dahl |
| 2013/0176258 A1 | 7/2013 | Dahl et al. |
| 2013/0179034 A1 | 7/2013 | Pryor |
| 2013/0194180 A1 | 8/2013 | Ahn et al. |
| 2013/0201316 A1 | 8/2013 | Binder et al. |
| 2013/0211843 A1 | 8/2013 | Clarkson |
| 2013/0216094 A1 | 8/2013 | DeLean |
| 2013/0236089 A1 | 9/2013 | Litvak et al. |
| 2013/0335573 A1 | 12/2013 | Forutanpour et al. |
| 2014/0007022 A1 | 1/2014 | Tocino diaz et al. |
| 2014/0043598 A1 | 2/2014 | Bamji et al. |
| 2014/0119599 A1 | 5/2014 | Dal Mutto et al. |
| 2014/0152569 A1 | 6/2014 | Liu et al. |
| 2014/0173440 A1 | 6/2014 | Mutto et al. |
| 2014/0211991 A1 | 7/2014 | Stoppa et al. |
| 2014/0211992 A1 | 7/2014 | Stoppa et al. |
| 2014/0298273 A1 | 10/2014 | Blackstone et al. |
| 2015/0009119 A1 | 1/2015 | Zuccarino et al. |
| 2015/0038231 A1* | 2/2015 | Mahlmeister .......... A63F 13/06 463/37 |
| 2015/0057082 A1 | 2/2015 | Kareemi et al. |
| 2015/0062003 A1 | 3/2015 | Rafii et al. |
| 2015/0062004 A1 | 3/2015 | Rafii |
| 2015/0089453 A1 | 3/2015 | Mutto et al. |

FOREIGN PATENT DOCUMENTS

| | | |
|---|---|---|
| WO | 2006011153 A2 | 2/2006 |
| WO | 2007052262 A2 | 5/2007 |
| WO | 2006011153 A3 | 10/2008 |
| WO | 2008126069 A2 | 10/2008 |
| WO | 2007052262 A3 | 4/2009 |
| WO | 2008126069 A3 | 4/2009 |
| WO | 2009128064 A2 | 10/2009 |
| WO | 2009142443 A2 | 11/2009 |
| WO | 2009128064 A3 | 1/2010 |
| WO | 2010026587 A1 | 3/2010 |
| WO | 2010030296 A1 | 3/2010 |
| WO | 2010046901 A2 | 4/2010 |
| WO | 2010046901 A3 | 8/2010 |
| WO | 2010086866 A1 | 8/2010 |
| WO | 2010096279 A2 | 8/2010 |
| WO | 2010103482 A2 | 9/2010 |
| WO | 2010096279 A3 | 11/2010 |
| WO | 2010103482 A3 | 11/2010 |
| WO | 2011013079 A1 | 2/2011 |
| WO | 2011033519 A1 | 3/2011 |
| WO | 2011045789 A1 | 4/2011 |
| WO | 2012011044 A1 | 1/2012 |
| WO | 2012020380 A1 | 2/2012 |
| WO | 2012020410 A2 | 2/2012 |
| WO | 2012066501 A1 | 5/2012 |
| WO | 2012081012 A1 | 6/2012 |
| WO | 2012093394 a2 | 7/2012 |
| WO | 2012095756 A2 | 7/2012 |
| WO | 2012098534 A1 | 7/2012 |
| WO | 2012107892 A2 | 8/2012 |
| WO | 2012119633 A1 | 9/2012 |
| WO | 2012119885 A1 | 9/2012 |
| WO | 2012107892 A3 | 11/2012 |
| WO | 2012164562 a1 | 12/2012 |
| WO | 2013008236 A1 | 1/2013 |
| WO | 2013018099 A2 | 2/2013 |
| WO | 2013021385 A2 | 2/2013 |
| WO | 2012095756 A3 | 7/2013 |
| WO | 2014120554 A2 | 8/2014 |
| WO | 2014120554 A3 | 3/2015 |

OTHER PUBLICATIONS

Sigal, L., S. Sclaroff, and V. Athitsos. "Skin Color-based Video Segmentation under Time-varying Illumination." IEEE Transactions on Pattern Analysis and Machine Intelligence IEEE Trans. Pattern Anal. Machine Intell. 26.7 (2004): 862-77.*

International Preliminary Report on Patentability for International Application PCT/US2014/012748, Report dated Aug. 4, 2015, dated Aug. 13, 2015, 15 Pgs.

International Search Report and Written Opinion for International Application PCT/US2014/012748, report dated Nov. 30, 2014, dated Jan. 14, 2015, 17 Pgs., Jan. 14, 2015.

"0V7740 VGA product brief", OmniVision, Retrieved Jul. 29, 2008, from: http://www.ovt.com/download_document.php?type=sensor&sensorid=83, 2 pgs.

"PointGrab Announces New Hand Gesture Control Solution for the Latest Premium Samsung Smart TV Models", Yahoo! Finance, Retrieved on Apr. 4, 2013, from http://www.finance.yahoo.com/news/pointgrab-announces-hand-gesture-control-22000959.html, 2 pgs.

Belaroussi, et al., "Comparison of Different Combination Strategies for Face Localization", Proceedings of the 2006 International Conference on Image Processing, Computer Vision, & Pattern Recognition, Las Vegas, Nevada, Jun. 26-29, 2006, pp. 383-389.

CANESTA3D, "Canesta 3D ToF Sensor Demo for Living Room", Youtube, Oct. 28, 2010, Retrieved from: http://www.youtube.com/watch?v=TmKShSHOSYU.

CANESTA3D, "Canesta PC demo video", Youtube, Oct. 25, 2010, Retrieved from: http://www.youtube.com/watch?v=I36Aqk1A6vY.

CANESTA3D, "Canesta TV Gesture User Interface Demo", Youtube, May 29, 2009, Retrieved from: http://www.youtube.com/watch?v=uR27dPHI7dQ.

CANESTA3D, "Canesta's latest 3D Sensor—"Cobra" . . . highest res CMOS 3D depth sensor in the world", Youtube, Oct. 25, 2010, Retrieved from: http://www.youtube.com/watch?v=5_PVx1NbUZQ.

CANESTA3D, "Future of Remote Control", Youtube, Oct. 29, 2009, Retrieved from: http://www.youtube.com/watch?v=vnfdoDHiNil.

CANESTA3D, "Point Cloud Demo, using Canesta's 320×200 3D Tof Image Sensor", Youtube, Oct. 28, 2010, Retrieved from: http://www.youtube.com/watch?v=4xlXsJuH74c.

Carmody, Tim , "Why 'Gorilla Arm Syndrome' Rules Out Multitouch Notebook Displays", Wired, Oct. 21, 2010, Retrieved from http://www.wired.com/gadgetlab/2010/10/gorilla-arm-multitouch/, 3 pgs.

Forssen, et al., "Shape Descriptors for Maximally Stable Extremal Regions", Computer Vision, 2007. ICCV 2007. IEEE 11$^{th}$ International Conference on, Oct. 14, 2007, 1-8.

Forsyth, "Computer Vision—A Modern Approach", Recognition as Template Matching, Nov. 5, 2011, 46 pgs.

Hasan et al., "Real Time Fingers and Palm Locating using Dynamic Circle Templates", International Journal of Computer Applications, vol. 41, No. 6, Mar. 6, 2012, pp. 33-43.

Kerdvibulvech et al., "Markerless Guitarist Fingertip Detection Using a Bayesian Classifier and a Template Matching for Supporting Guitarists", Proc. 10th Virtual Reality Int. Conf., Apr. 3, 2008, 7 pgs.

Kolsch et al., "Flocks of Features for Tracking Articulated Objects", Retrieved Jul. 5, 2005, from http://www.cs.ucsb.edu/~mturk/pubs/KolschBook05.pdf, pp. 1-18, Index.

(56) References Cited

OTHER PUBLICATIONS

Lin, John, "Visual Hand Tracking and Gesture Analysis", Dissertation, University of Illinois at Urbana-Champaign, Aug. 12, 2004, 116 pgs.
Murase et al., "Gesture Keyboard Requiring Only One Camera", ACM UIST'11, Oct. 16-19, 2011, Santa Barbara, CA, pp. 1-2.
Nosowitz, "The Second Wave of Gesture-Controlled TVs", Popular Science, Retrieved on Apr. 4, 2013, from: www.popsci.com/gadgets/article/2012-01/second-wave-gesture-controlled-tvs, 6 pgs.
Onishi et al., "3D Human Posture Estimation Using HOG Features of Monocular Images", Pattern Recognition, Peng-Yeng Yin (Ed.), Intech, DOI:10.5772/7541., Oct. 1, 2009, pp. 1-11.
Rautaray et al., "Vision Based Hand Gesture Recognition for Human Computer Interaction: A Survey", Artificial Intelligence Review, Springer, Nov. 6, 2012, 54 pgs.
Thayananthan, Arasanathan, "Template-based Pose Estimation and Tracking of 3D Hand Motion", Dissertation, University of Cambridge, Oct. 8, 2005, 172 pgs.
Vincent et al., "Matching with epipolar gradient features and edge transfer", Image Processing, 2003. ICIP 2003. Proceedings.2003 International Conference on (vol. 1), I, Sep. 12, 2003, 277-80.
Zhang, Zhengyou, "Flexible Camera Calibration by Viewing a Plane From Unknown Orientations", Microsoft Research, Redmond, WA, Sep. 20, 1999, 8 pgs.

\* cited by examiner

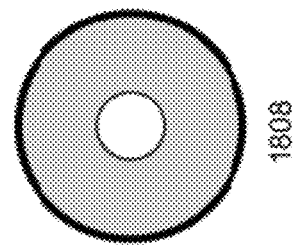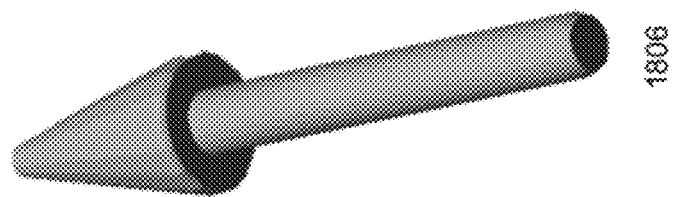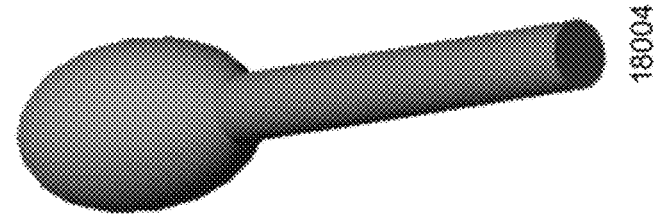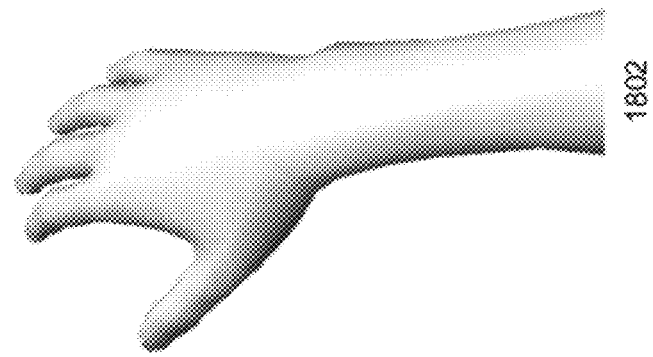
Fig. 18

METHOD AND SYSTEM FOR ERGONOMIC TOUCH-FREE INTERFACE

STATEMENT OF GOVERNMENT SPONSORED SUPPORT

This invention was made with Government support under contract N00014-07-1-0747-P00004 awarded by the Office of Naval Research. The Government has certain rights in this invention.

FIELD OF THE INVENTION

The present invention generally relates to the field of image processing and user interfaces. More particularly, the present invention relates to a touch-free user interface that makes use of image information.

BACKGROUND OF THE INVENTION

Human-computer interaction (HCI) is the study, planning, and design of the interaction between humans and computers or other artificial devices. Interaction between users and computers occurs at the user interface (or simply interface), which includes both software and hardware. For example, characters or objects displayed by software on a personal computer's monitor, input received from users via hardware peripherals such as keyboards and mice, and other user interactions with large-scale computerized systems such as aircraft and power plants. HCI is the discipline concerned with the design, evaluation and implementation of interactive computing systems for human use and with the study of major phenomena surrounding them. Not to be ignored in HCI is user satisfaction of the interaction experience.

Because human-computer interaction studies a human and a machine in conjunction, it draws from supporting knowledge on both the machine and the human side. On the machine side, techniques in computer graphics, operating systems, programming languages, display technology, interactive hardware, and development environments are relevant. On the human side, communication theory, graphic and industrial design disciplines, linguistics, social sciences, cognitive psychology, and human factors are relevant.

Ergonomics is the study of designing equipment and devices that fit the human body, its movements, and its cognitive abilities. Proper ergonomic design is necessary to prevent repetitive strain injuries, which can develop over time and can lead to long-term disability. Ergonomics is the scientific discipline concerned with the understanding of interactions among humans and other elements of a system, and the profession that applies theory, principles, data and methods to design in order to optimize human well-being and overall system performance.

Ergonomics takes account of the user's capabilities and limitations in seeking to ensure that tasks, equipment, information and the environment suit each user. To assess the fit between a person and the used technology, ergonomists consider the job (activity) being done and the demands on the user; the equipment used (its size, shape, and how appropriate it is for the task), and the information used (how it is presented, accessed, and changed). Ergonomics draws on many disciplines in its study of humans and their environments, including anthropometry, biomechanics, mechanical engineering, industrial engineering, industrial design, kinesiology, physiology and psychology.

Ergonomics is also used to refer to physical ergonomics as it relates to the workplace (as in for example ergonomic chairs and keyboards). Ergonomics in the workplace considers the safety of employees, both long and short-term. Ergonomics can help reduce costs by improving safety. For example, over five million workers sustain overextension injuries per year. Through ergonomics, workplaces can be designed so that workers do not have to overextend themselves and the manufacturing industry could save billions in workers' compensation.

Ergonomic problems may be fixed through equipment design, task design, or environmental design. Equipment design changes the actual, physical devices used by people. Task design changes what people do with the equipment. Environmental design changes the environment in which people work, but not the physical equipment they use.

Ergonomics is employed to fulfill the two goals of health and productivity. It is relevant in the design of such things as safe furniture and easy-to-use interfaces to machines, including computer interfaces. Attention to human-machine interaction is important, because poorly designed human-machine interfaces can lead to many unexpected problems, including physiological and other problems due to bad ergonomics.

With so many modern worker spending many hours working on a computer, the effects of bad ergonomics has been seen with the increase ailments such as repetitive stress injuries and carpal tunnel syndrome, for example.

Prior art computer interfaces include a keyboard, mouse, and monitor. With advances in image processing and computing power, touch-free interfaces have become possible. Touch-free interfaces, however, are not immune from bad ergonomic design.

The present invention is directed to, among other things, providing an ergonomic and touch-free computer interface that allows a user to provide input to a computer using natural and ergonomic gestures without for awkward gestures that are not ergonomically sound.

SUMMARY OF THE INVENTION

Where wired or physical objects have been necessary so as to interface with a computer in the past, it was necessary for the human body to reach out and move in very particular and sometimes harmful ways. With the advent of touch-free interfaces such as described in the present disclosure, it is no longer necessary for computer interfaces to be in predefined locations (e.g., desktops) or configuration (e.g., rectangular keyboard). The present invention makes use of touch-free interfaces to encourage users to interface with a computer in an ergonomically sound manner.

Among other things, the present invention implements a system for localizing human body parts such as hands, arms, shoulders, or the fully body, with a processing device such as a computer along with a computer display to provide visual feedback on the display that encourages a user to maintain an ergonomically preferred position with ergonomically preferred motions. For example, the present invention encourages a user to maintain his motions within an ergonomically preferred range without have to reach out excessively or repetitively.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

FIG. 18 is an illustration of various levels of abstraction for cursors according to various embodiments of the invention.

DETAILED DESCRIPTION OF THE INVENTION

Figure 1:
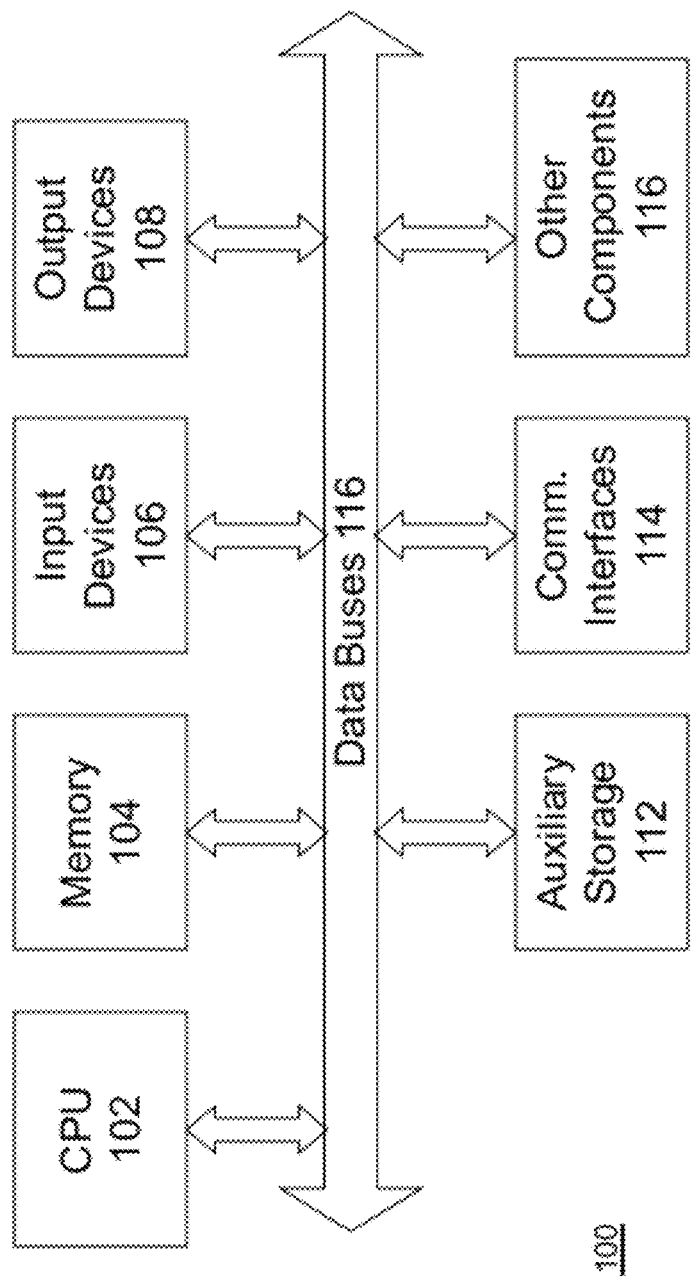
FIG. 1 is a block diagram of a computer system on which the present invention can be implemented.

Among other things, the present invention relates to methods, techniques, and algorithms that are intended to be implemented in a digital computer system 100 such as generally shown in FIG. 1. Such a digital computer or embedded device is well-known in the art and may include the following.

Computer system 100 may include at least one central processing unit 102 but may include many processors or processing cores. Computer system 100 may further include memory 104 in different forms such as RAM, ROM, hard disk, optical drives, and removable drives that may further include drive controllers and other hardware. Auxiliary storage 112 may also be include that can be similar to memory 104 but may be more remotely incorporated such as in a distributed computer system with distributed memory capabilities.

Computer system 100 may further include at least one output device 108 such as a display unit, video hardware, or other peripherals (e.g., printer). At least one input device 106 may also be included in computer system 100 that may include a pointing device (e.g., mouse), a text input device (e.g., keyboard), or touch screen.

Communications interfaces 114 also form an important aspect of computer system 100 especially where computer system 100 is deployed as a distributed computer system. Computer interfaces 114 may include LAN network adapters, WAN network adapters, wireless interfaces, Bluetooth interfaces, modems and other networking interfaces as currently available and as may be developed in the future.

Computer system 100 may further include other components 116 that may be generally available components as well as specially developed components for implementation of the present invention. Importantly, computer system 100 incorporates various data buses 116 that are intended to allow for communication of the various components of computer system 100. Data buses 116 include, for example, input/output buses and bus controllers.

Indeed, the present invention is not limited to computer system 100 as known at the time of the invention. Instead, the present invention is intended to be deployed in future computer systems with more advanced technology that can make use of all aspects of the present invention. It is expected that computer technology will continue to advance but one of ordinary skill in the art will be able to take the present disclosure and implement the described teachings on the more advanced computers or other digital devices such as mobile telephones or "smart" televisions as they become available. Moreover, the present invention may be implemented on one or more distributed computers. Still further, the present invention may be implemented in various types of software languages including C, C++, and others. Also, one of ordinary skill in the art is familiar with compiling software source code into executable software that may be stored in various forms and in various media (e.g., magnetic, optical, solid state, etc.). One of ordinary skill in the art is familiar with the use of computers and software languages and, with an understanding of the present disclosure, will be able to implement the present teachings for use on a wide variety of computers.

The present disclosure provides a detailed explanation of the present invention with detailed explanations that allow one of ordinary skill in the art to implement the present invention into a computerized method. Certain of these and other details are not included in the present disclosure so as not to detract from the teachings presented herein but it is understood that one of ordinary skill in the at would be familiar with such details.

The present invention makes use of digitized image and video information that can be captured in various ways so as to extract depth cues. For example, specialized cameras can be implemented that are designed to capture depth cues from body image information. Also, more general cameras, including web cameras, stereo cameras, and time-of-flight devices, can be used to capture body image information where such information is then used to generate depth cues. Still other types of cameras can be used to capture, for example, infrared image information. Still other image information can be captured using time-of-flight cameras that use specialized lasers to capture depth information for body images such as from information about the size of body parts.

Figure 2:
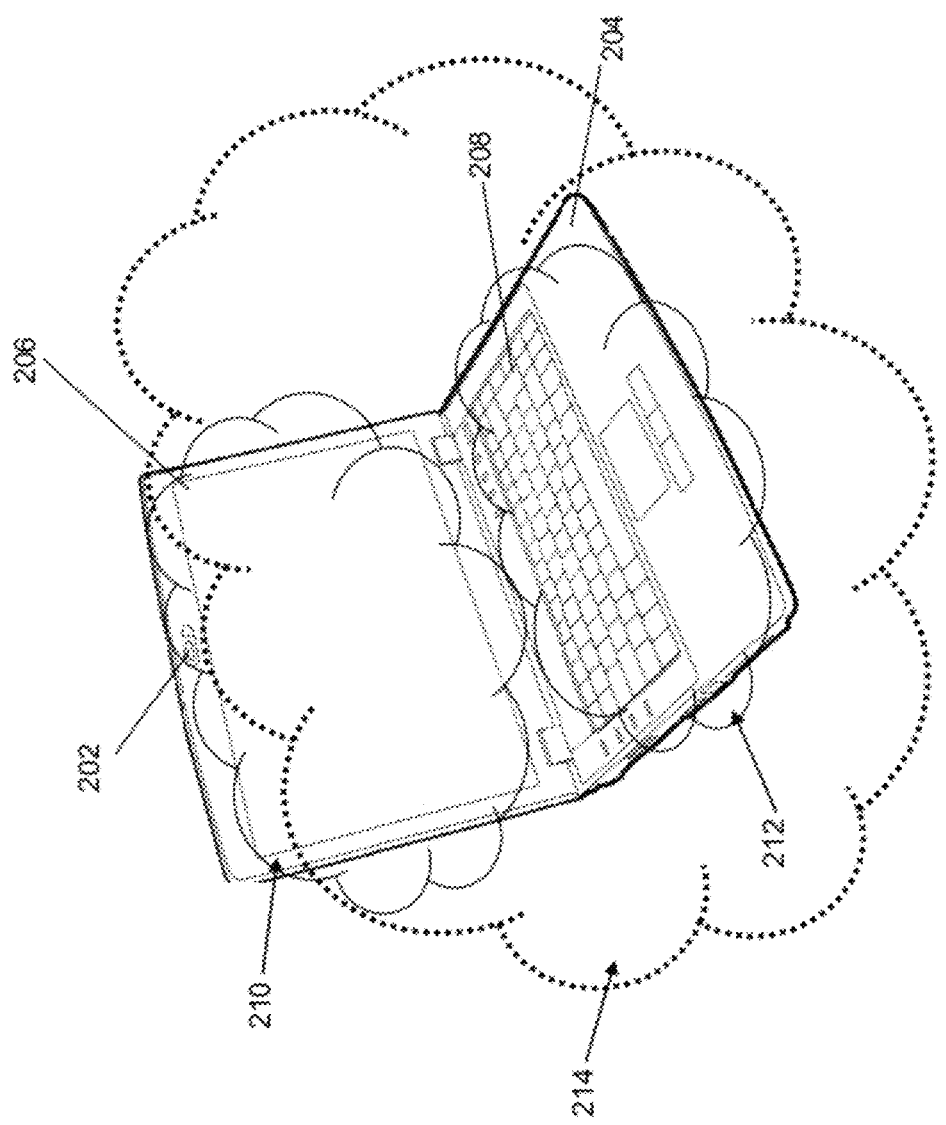
FIG. 2 is an image of a portable computer and a depiction of various actions spaces relative to the computer.

In one embodiment of the invention, a webcam is used for image input information. Multiple frames of the webcam image information are used to generate depth cues to be used according to the present invention. A webcam provides several advantages including its low cost as well as its wide application in modern computers. For example, as shown in FIG. 2, a webcam 202 as may be preinstalled in a laptop computer 204 may be used. An issue with the use of a webcam on a portable computer 204 is that its field of view may be fixed based on the position of the display 206.

For example webcam 202 is generally positioned by the position of display 206 that is set for a desirable viewing angle by a user. In providing a desirable viewing angle for display 206, webcam 202 is also generally positioned to capture certain actions performed by the user. For example, in such a position, webcam 202 is able to capture body position information directly in front of display 206. This can be appropriate when it is desired to capture gesture and other information from user 208 in an action space 214 in front of display webcam 202 at a distance of approximately several feet. If information from a different action space is desired to be captured, webcam 202 of computer 204 may not be properly positioned. For example webcam 202 is not able to capture information from action space 212 that is directly above the keyboard 208 or in action space 210 that is directly in front of display 206. One manner of addressing this issue is to use multiple cameras directed at different actions spaces.

Figure 3:
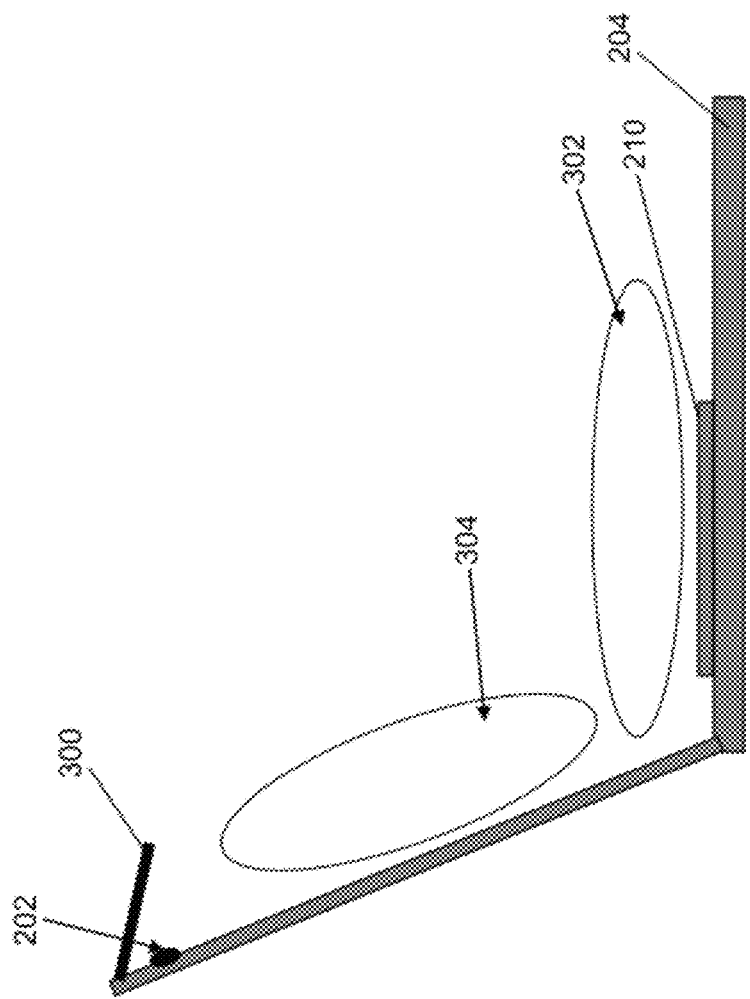
FIG. 3 is an image of a portable computer and a depiction of various actions spaces relative to the computer.

Another manner of addressing this issue according to an embodiment of the invention is to use a light bending apparatus 300 of FIG. 3 that is positioned around or near webcam 202 so as to reflect images from the appropriate action space. For example, as shown in FIG. 3, reflecting apparatus 300 is positioned in front of webcam 202 so as to capture image information from action space 302 that is directly above keyboard 210 of computer 204. Where it may be desirable to capture image information from another action space, e.g., action space 304 directly in front of display 206, mirrored apparatus 300 can be repositioned to capture such image information.

As shown in FIG. 3, light-bending apparatus 300 makes use of a mirror so as to redirect image information from action spaces of interest to webcam 202. In other embodiments, light-bending apparatus 300 can be implemented using other methods of bending light such as through the use of prisms or fiber optic cables. These and other methods of bending light are known to those of skill in the art and their implementation does not deviate from the present invention.

Figure 4:
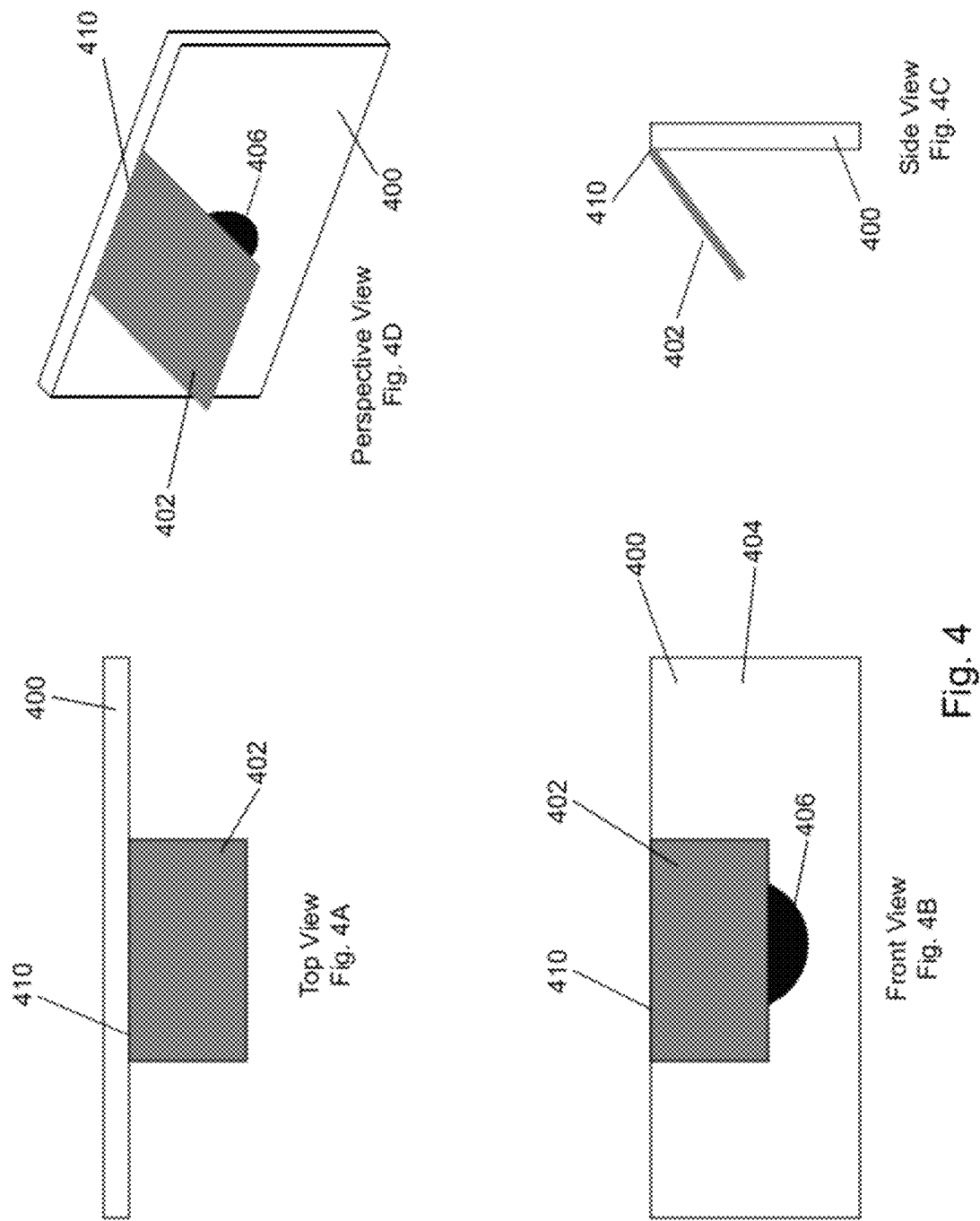
FIG. 4 shows various perspectives of a light bending apparatus according to an embodiment of the invention.

Shown in FIG. 4 is a more detailed view of an implementation of light-bending apparatus 400 as implemented with a mirror 402. As shown, light-bending apparatus 400 includes a base 404 that is configured to be mounted on or around webcam 406 on a computer body (not shown). For example, base 404 may be permanently glued to the computer body. In another embodiment, hook and loop fasteners are used to provide a light-bending apparatus. Reflecting apparatus 400 includes mirror 408 that is connected to base 404 by hinge 410. Mirror 408 can, therefore, be positioned to capture image information from a desired action space such as discussed above.

Figure 5:
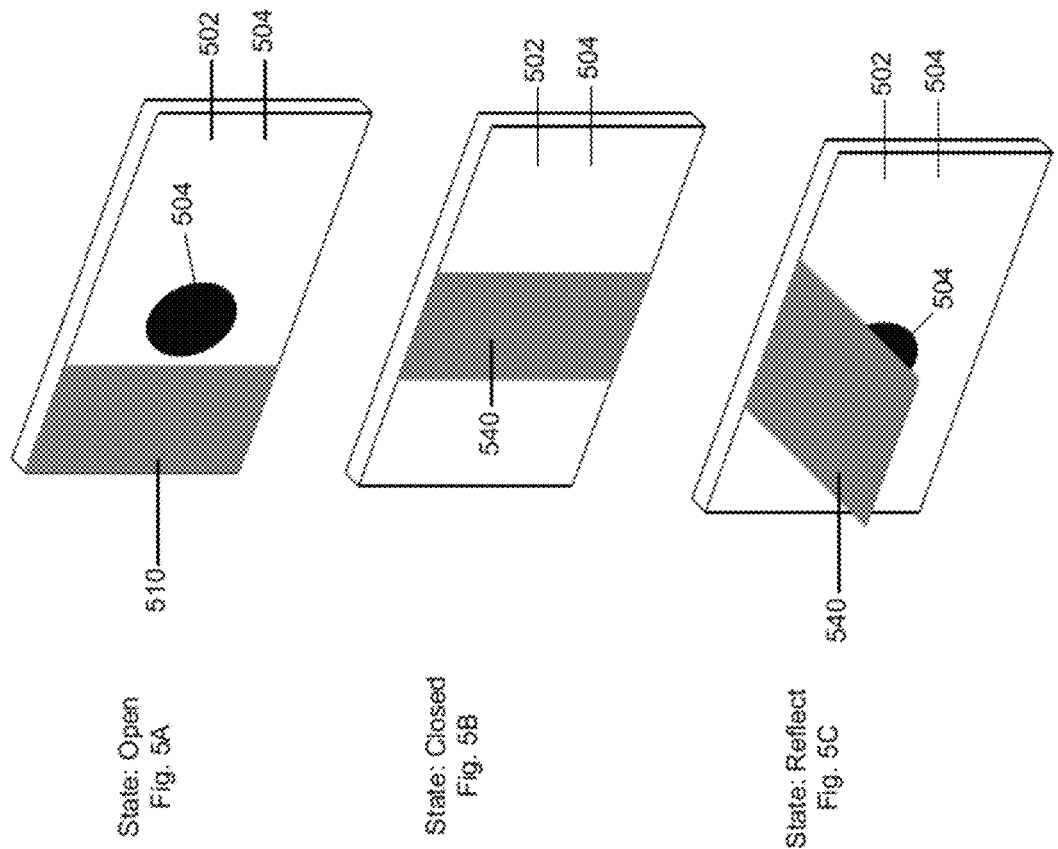
FIG. 5 shows various states of a light bending apparatus according to an embodiment of the invention.

Another embodiment of the invention is shown in FIG. 5. As shown in FIG. 5, light-bending apparatus 502 is similar to reflecting apparatus 400 with some notable enhancements. As shown in FIG. 5, light-bending apparatus 502 includes a base 504 that allows mirror 310 to be slid into multiple positions. For example, as shown in FIG. 5, three states are available: open as shown in FIG. 5A, closed as shown in FIG. 5B, and reflect as shown in FIG. 5 C. More specifically, as shown in FIG. 5A an open state is shown with mirror 504 positioned to the side of camera 504 such that the reflecting qualities of mirror 504 is not used. As shown in FIG. 5B a closed state is shown with mirror 504 positioned in front of camera 504 and in a down position such that mirror 504 prevents camera 504 from receiving image information. As shown in FIG. 5C a reflect state is shown with mirror 504 positioned in front of camera 504 so as to capture image information from an action space of interest as discussed above. For example, in a reflecting position, light-bending apparatus 502 can reflect image information from an action space directly above the keyboard.

In an embodiment, light-bending apparatus 502 provides position information that can be used by methods of the present invention. Position information can be provided by, for example, switches or latches that respond to the position of mirror 504.

Figure 6:
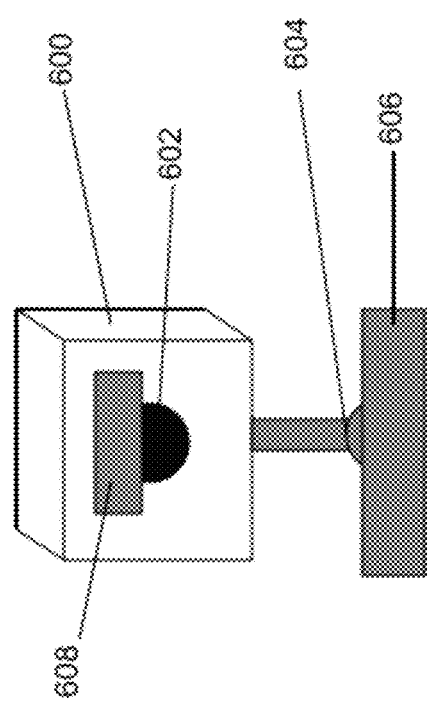
FIG. 6 shows a web cam that includes a light bending apparatus according to an embodiment of the invention.

In an embodiment of the invention, a stand-alone webcam 600 as shown in FIG. 6 is used that is mounted on a swivel base 604. Swivel base 604 allows stand-alone webcam 600 to be position as desired so as to capture appropriate action space information. In yet another embodiment, stand-alone webcam 600 is further configured with reflecting apparatus 608. In such an embodiment, stand-alone webcam 600 may or may not have a swivel base but because of the functionality of light-bending apparatus 600, a broad field of view is available to capture action spaces of interest.

In still another embodiment of the invention, a specialized depth camera may be used. Such a depth camera may be for example a time-of-flight camera that uses at least one infrared laser to determine depth of field information. Also active illumination can be used so as to facilitate depth reconstruction where such active illumination could be in a light spectrum outside of visible light.

In another embodiment of the invention, a stereoscopic camera may be used. Such a camera uses two cameras separated by a predetermined distance that are used to provide slightly different image input from which three-dimensional depth of field information can be obtained.

It should be noted that where the light-bending apparatus implements a mirror, the captured image information is a mirror image. In an embodiment of the invention, mirror image information is transformed to corrected-image information before other algorithms are implemented. In another embodiment of the invention, mirror image information is not converted and algorithms of the present invention account for such mirror image information.

According to the present invention, various other coordinate transformations can be implemented. For example, an embodiment of the invention can implement fixed positioning where an action space includes fixed mapping between a calibrated action space and inputs to the present invention. For example, where action space 210 above display 206 of FIG. 2 is used, fixed areas of display 206 correspond to predetermined inputs to the system so as to mimic a touchscreen. For a touchscreen-like implementation, a direct transformation system can also be used that maps a Cartesian space in the real world to Cartesian display coordinates. Indirect fixed transformations can also be used to translate from a curved or spherical real world space to a fixed Cartesian space. Adaptive versions of these algorithms that adapt to changing user behavior are also possible.

In another embodiment of the invention, adaptive positioning is implemented. In this embodiment, the present invention adapts to inputs and maps such inputs to a fixed input. For example, in mimicking a keyboard on a table top, the present invention receives image input for the hands and fingers of a user's hand and maps their movement to a keyboard to provide input to the system. The present invention can adapt to other inputs including mouse-like or trackpad-like movements. Generally, the present invention can implement three- or two-dimensional transformations and can further be learned or adaptive to a continuously current situation. Alternatively, it can be with reference to a fixed position In another embodiment of the invention, relative positioning is used such as implemented in mouse-like inputs that make use of, for example, forwarding of velocities or acceleration instead of fixed positions.

In various embodiments of the invention, different action spaces are used where an action space is generally a space where actions are expected to occur. Actions of interest can include hand and finger gestures as well as movements of other body parts. The present invention makes use of image information from the action space of interest to generate depth cues to interpret the actions of interest.

In an embodiment of the invention, the action space can include the area directly near a screen of a computer such as action space 210 of FIG. 2. In this embodiment, the user touches different areas of the computer screen that are received by the image input device and translated as input to the system of the present invention. In this way, the present invention provides functionality similar to functionality provided by a touch-sensitive screen, sometimes also called touch screen.

Figure 7:
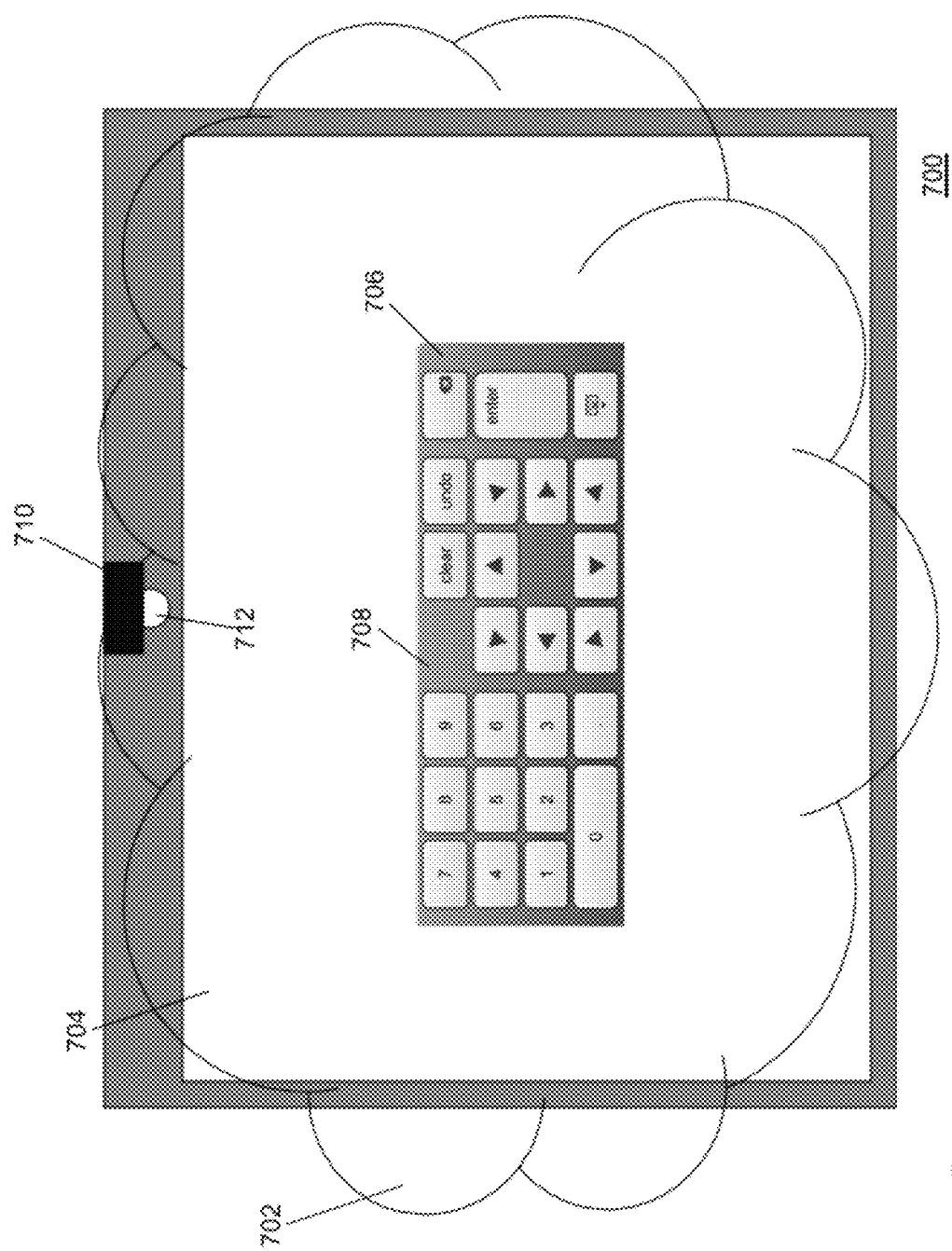
FIG. 7 shows a computer display and an action space according to an embodiment of the invention.

System 700 as shown in FIG. 7 is exemplary. As shown, a user may be presented with an image 706 on computer display 704 to which a user will respond. For example, as shown, image 706 is in the form of a number keypad 708. A user can then be prompted to, for example, touch the screen so as to enter a telephone number or other numeric information. Although the user would respond by touching areas of image 706, the screen 704 need not be touch-sensitive. The system of the present invention can collect image information from action space 702 so as to respond appropriately. For example, in an embodiment of the invention, a finger tip is an action body part to which the invention responds. By capturing image information from action space 702 that provides image 706 with an opportunity to make appropriate movements. The user can then touch the screen where the image 706 appears.

An image input device as discussed previously, in this case a camera, receives input information that detects the presence of an action body part that has been predetermined to be an input point and further detects actions of the action body part corresponding to a pressing, selection, or activation action. System 700, therefore, translates the actions of the user's forefinger as a touchscreen operation and further determines a mapping that determines the desired action by the user, in this case, selection of certain numbers on a keypad.

Many more possibilities are available through the use of the present invention. In fact, essentially all mouse input actions can be provided the touchscreen mode of the present invention. For example, click and drag operations are available where the system of the present invention detects a press down action of a user's finger on the virtual touchscreen of FIG. 7 and then detects a dragging operation across the screen. Notably, the present invention, detects these actions through the image input device and not necessarily input information from a conventional touchscreen with touch sensors (e.g., capacitive sensors) on the screen.

In another embodiment of the invention, the action space includes hovering over a computer display without need to actually touch the display. In this embodiment, rather than a user touching the computer display, the user instead hovers over the display and performs essentially the same actions of the virtual touchscreen embodiment except that it is not necessary to touch the display. This embodiment can be desirable because it avoids blemishing the computer display with oils or soil that may be present on a user's hand. Also, this embodiment may be desirable so as to avoid physical damage to a computer display.

In this embodiment, the system of the present invention translates an action space 710 that is a predetermined distance above the computer display into an action space.

In another embodiment of the invention, the action space of interest can be action space 212 above keyboard 208 as shown in FIG. 2. From action space 212, the present invention makes use of information relating to a user's hands or fingers so as to generate input to a computer including but not limited to mouse-like inputs. In making use of action space 212, the space above keyboard 208 can be used but inputs from the keyboard can also be used. For example, the present invention can make use of the position of a user's forefinger and can further detect that the forefinger is making a downward motion. Such downward motion can also be detected by keyboard 208 as the pressing of certain keys. The pressing of keys can also serve to calibrate the detected position of the user's forefinger or other body part. In this embodiment, the movements and actions are similar to those used for a traditional touchpad where a user can move his forefinger in action space 212 for touchpad movement operations and can further make up-and-down finger motions for clicking operations. Many more operations, however, are possible.

In another embodiment of the invention, an action space can be a space over any other object including, for example, a table top. Touchpad-like operations as described above can be made without need for direct input to a computer. In yet another embodiment of the invention, finger positions are detected in such an action space to mimic a keyboard. In such an embodiment, a user can make keyboard movements such as would be performed on a QWERTY keyboard to provide input to a computer. A template could be used with an outline of a keyboard but the present invention does not require such a template.

In another embodiment of the invention, action space 214 between the user and the computer 204 of FIG. 2 is used. In this embodiment, a user's fingers, hands, head position, or other position information are detected so as to provide a wide variety of input signals. Conventional mouse input signals are available in this embodiment but so are many more types of input signals. For example, with the general position of a user's hands available as input, common hand movements can be interpreted as input. For example, hand and arm positions can be detected to provide grabbing and moving actions. Such an embodiment can be used in computerized game applications for example.

Along with body part detection, other objects can also be detected. For example, in gaming applications, sports equipment or props can be detected, including tennis rackets, bats, mitts, balls, etc. Also, in a writing application, the position of a pen, for example, can be detected as text or signature input.

Other hand information can also be made available including the back or palm position of a user's hand. Also, the position of a user's primary input finger (e.g., forefinger) is available. Still further, the position of each of a user's fingers can be tracked and used as input.

The input system of the present invention can be used as a replacement for conventional input devices but can also be used in connection with and as a supplement to conventional input devices. For example, in an embodiment of the invention, key strokes, mouse movements, and clicks can be used to turn on features of the present invention. In an embodiment, a combination of keystrokes is used to initiate operation of the present invention. In another embodiment, menu selections and mouse clicks are used to initiate operation of the present invention.

Figure 8:
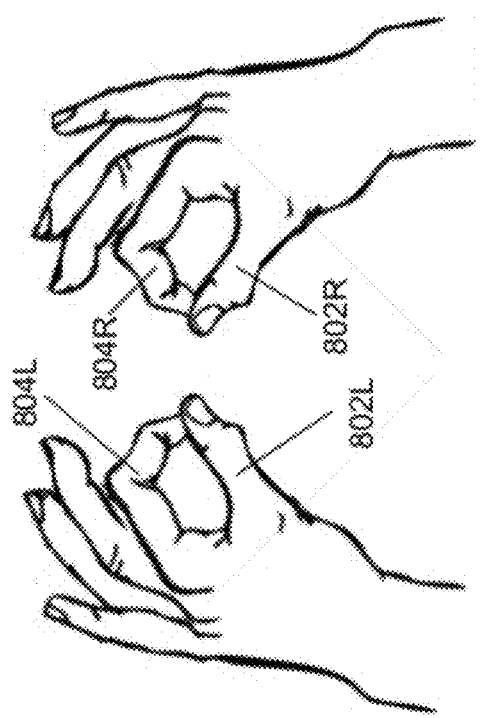
FIG. 8 shows hand gestures to initiate certain operations according to an embodiment of the invention.

In yet another embodiment of the present invention, the system is initiated by performing predetermined actions. For example, the system of the present invention can be initiated as shown in FIG. 8 when a user touches his thumb 802L to his forefinger 804L while simultaneously touching his thumb 802R to his forefinger 804R. These finger motions provide an affirmative signal to the present invention that features of the present invention should be initiated. It is important to note that in this embodiment of the invention, the system of the present invention is operable before the user touches his fingers together, but the system may not be in full operation to provide predetermined inputs to the computer system (e.g., mouse clicks, drag and drop, etc.). The system is at least operable to detect the presence of the initiation signal (e.g., touching thumbs and forefingers together).

Figure 9:
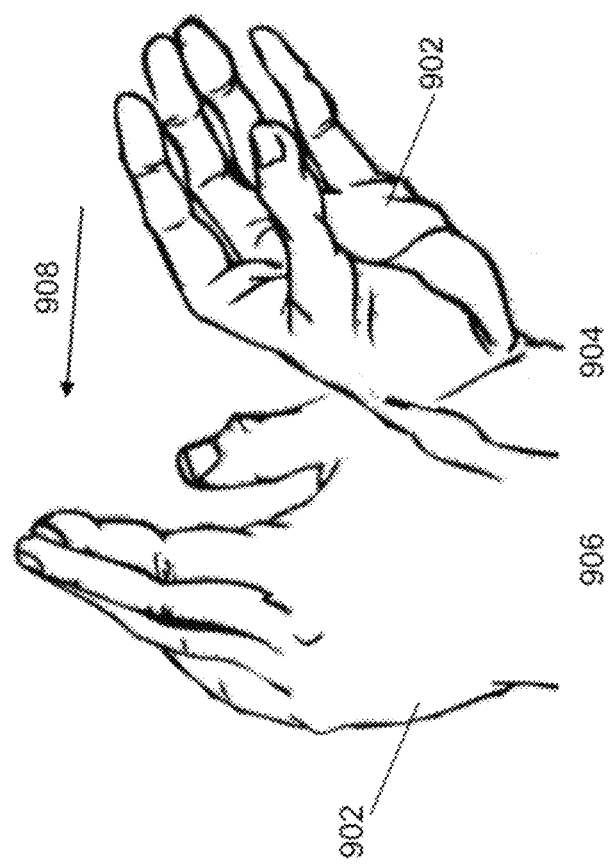
FIG. 9 shows a hand gesture to initiate certain operations according to an embodiment of the invention.

FIG. 9 demonstrates another gesture that can be used to initiate the system of the present invention. As shown, a user's hand 902 performs a flicking operation by moving from a position 904 to a position 906 as indicated by arrow 908. In another embodiment of the invention, two-hand flicking, hand swipes, or finger motions are used to initiate operation of the system. In an embodiment of the invention, gestures used to initiate the system of the present invention are selected as generally unusual gestures that are not common during the use of a computer system so as not to inadvertently initiate the system.

In an embodiment of the invention, the system of the present invention identifies an active part of a user's body. For example, an active part can be the user's forefinger 806 or the tip of the user's forefinger 808 as shown in FIG. 8. In other embodiments of the present invention, an active part can be more than one of a user's fingers, at least one of user's hand 902 as shown in FIG. 9, and can even include the arms, shoulders, and head, or eyes of a user.

In an embodiment of the invention where the position of a user's forefinger 808 (FIG. 8) is the active part, it can be necessary to identify the palm 910 (FIG. 9) and backside 912 (FIG. 9) of a user's hands. In this embodiment, the skin color of the hand is tracked and the shades of a user's palm and backside can be learned in a computerized method.

In another embodiment of the invention, a background subtraction algorithm is used to identify a user's hands. In this embodiment, a background is identified that is known to be in the absence of a user's hands. Upon detection of a user's hands, the algorithm performs a background subtraction to identify the changing position of a user's arms, hands, and fingers. In another embodiment, a change detection algorithm is implemented to detect the presence of moving and stationary objects. From identified moving objects, the position of a user's arms, hands, and fingers can be determined.

In an embodiment of the invention, a primary active part is a user's forefinger tip 808 (FIG. 8). Various algorithms are available for determination of a user's fingertip. For example, shape and appearance descriptors can be used to identify the fingertip of interest. A sliding window detector or a voting-based identification algorithm can also be used.

In an embodiment of the present invention, it is necessary to track active parts of a user's body or other objects. Depth cues from the tracked parts can then be used to interpret the actions in the action space of interest. Tracking can be achieved using several algorithms. For example, tracking can be performed using an optical flow algorithm. Using such an algorithm, the movement of an active part of a user, for example, a fingertip, can be followed across an action space. In another embodiment of the invention, a multi-hypothesis algorithm is used to track active parts of a user's body.

In still another embodiment of the invention, a model-based tracking algorithm is implemented. In such an embodiment, a three- or two-dimensional model of active parts of a user's body, for example, are developed in a depth image using the image input signal. An iterative closest point algorithm can also be used for this purpose.

In the present invention, it is necessary to identify an active part, for example, a fingertip, in an action space. Various algorithms are available for this purpose.

For example, an algorithm for color-based tracking under varying illumination can be used for real-time skin segmentation in video sequences. The skin segments can include the skin of a fingertip, finger, hand, palm, arm, etc. This algorithm enables reliable skin segmentation despite wide variation in illumination during tracking and localization.

In this algorithm, an explicit second order Markov model is used to predict evolution of the skin color histogram over time. Histograms are dynamically updated based on feedback from the current segmentation and based on predictions of the Markov model. The evolution of the skin color distribution at each frame is parameterized by translation, scaling and rotation in color space. Consequent changes in geometric parameterization of the distribution are propagated by warping and re-sampling the histogram. The parameters of the discrete-time dynamic Markov model are estimated using Maximum Likelihood Estimation, and also evolve over time. Quantitative evaluation of the method has been conducted on labeled ground-truth video sequences taken from popular movies.

Multiple hypothesis tracking for multiple target tracking can also be used for active part localization. In this algorithm, the target tracking objective is to collect image data from a field of view containing one or more potential targets of interest (e.g., active part) and to then partition the image data into sets of observations, or tracks that are produced by the same object (or target). The term target is used in a general sense.

Once tracks are formed and confined (so that background and other false targets are reduced), the number of targets of interest can be estimated and quantities such as target velocity, future predicted position, and target classification characteristics can be computed for each track. In this algorithm, multiple targets (e.g., multiple fingers, hands, body parts, etc.) can be tracked.

A template matching algorithm can also be used for active part localization. Template matching is find objects in an image (e.g., fingers, hands, etc.) which match a template image. Template matching can be subdivided between two approaches: feature-based and global matching. The feature-based approach uses the features of the search and template image, such as edges or corners, as the primary match-measuring metrics to find the best matching location of the template in the source image. The global approach, uses the entire template, with generally a sum-comparing metric (e.g., cross-correlation) that determines the best location by testing all or a sample of the viable test locations within the search image that the template image may match up to.

If the template image has strong features, a feature-based approach may be considered; the approach may prove further useful if the match in the search image might be transformed in some fashion. Since this approach does not consider the entirety of the template image, it can be more computationally efficient when working with source images of larger resolution, as the alternative approach, template-based, may require searching potentially large amounts of points in order to determine the best matching location.

For templates without strong features, or for when the bulk of the template image constitutes the matching image, a template-based approach may be effective. Template-based template matching can use a sampling of a large number of points. It is possible to reduce the number of sampling points by reducing the resolution of the search and template images by the same factor and performing the operation on the resultant downsized images (multiresolution, or pyramid, image processing), providing a search window of data points within the search image so that the template does not have to search every viable data point, or a combination of both.

An Iterative Closest Point (ICP) algorithm can also be used that minimize the difference between two clouds of points in an image. Such an ICP algorithm can be used to reconstruct two-dimensional or three-dimensional surfaces from different scans to localize active body parts. The algorithm iteratively revises the transformation (translation, rotation) needed to minimize the distance between the points of two raw scans.

Figure 10:
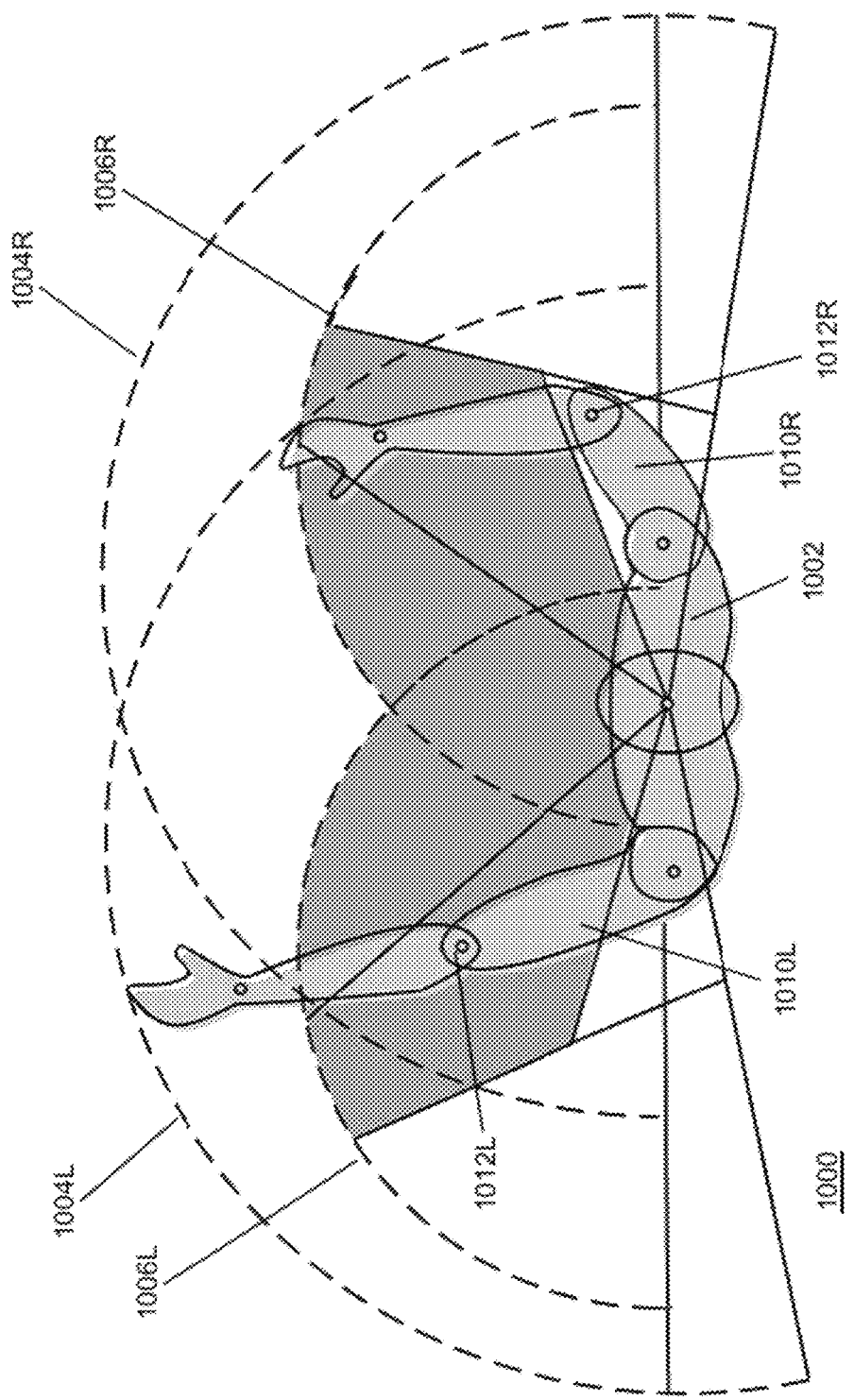
FIG. 10 is an image representing various upper body movements.

Shown in FIG. 10 is a diagram 1000 of bilaterally symmetric operating areas of the stationary human body 1002. Shown as arc 1004L is the range of motion for left arm 1010L when it is fully extended as shown. Arc 1004R is the range of motion for right arm 1010R were it to be fully extended (right arm 1010R not shown as fully extended). Shown as arc 1006R is the range of motion for right arm 1010R when right elbow 1012R is in the position shown. Shown as arc 1006L is the range of motion for left arm 1010L were left elbow 1012L to be in a similar position as the shown right elbow 1012R.

As seen in FIG. 10, the human body has a wide range of motion such that is able to operate and manipulate the objects it can reach. Historically, human-computer interfaces attempted to make use of as much of this range of motion as possible. For example, within the range of motion of arcs 1006L and 1006R, computer designers implement a keyboard. Also within the range of motion of arcs 1004L and 1004R, computer designers implement a mouse.

What ergonomists have found, however, is that the human body cannot tolerate repetitive motions within its full range of motion. In fact, one finding of ergonomists is that certain motions within a small range can be repeated many times without problems, while motions outside of such range can cause problems even if only occasionally done.

For example, with the advent of computer touch-screens, certain designers implemented designs that required users to essentially have their arms almost fully extended in the range between, for example, 1004R and 1006R for a right-handed person. What was found was that humans do not tolerate these motions very well and that such motions lead to problems. Basically, the human arm held in an unsupported horizontal position rapidly becomes fatigued and prone to injury and pain. This is called the "gorilla arm problem" as is often cited as an example of what not to do in ergonomics.

Where wired or physical objects have been necessary so as to interface with a computer in the past, it was necessary for the human body to reach out and move in very particular and sometimes harmful ways. With the advent of touch-free interfaces such as described in the present disclosure, it is no longer necessary for computer interfaces to be in predefined locations (e.g., desktops) or configuration (e.g., rectangular keyboard). The present invention makes us of touch-free interfaces to encourage users to interface with a computer.

Among other things, the present invention implements a system for localizing human body parts such as hands, arms, shoulders, or even the fully body, with a processing device such as a computer along with a computer display to provide visual feedback on the display that encourages a user to maintain an ergonomically preferred position with ergonomically preferred motions. For example, the present invention encourages a user to maintain his motions within an ergonomically preferred range without have to reach out excessively or repetitively.

Figure 11:
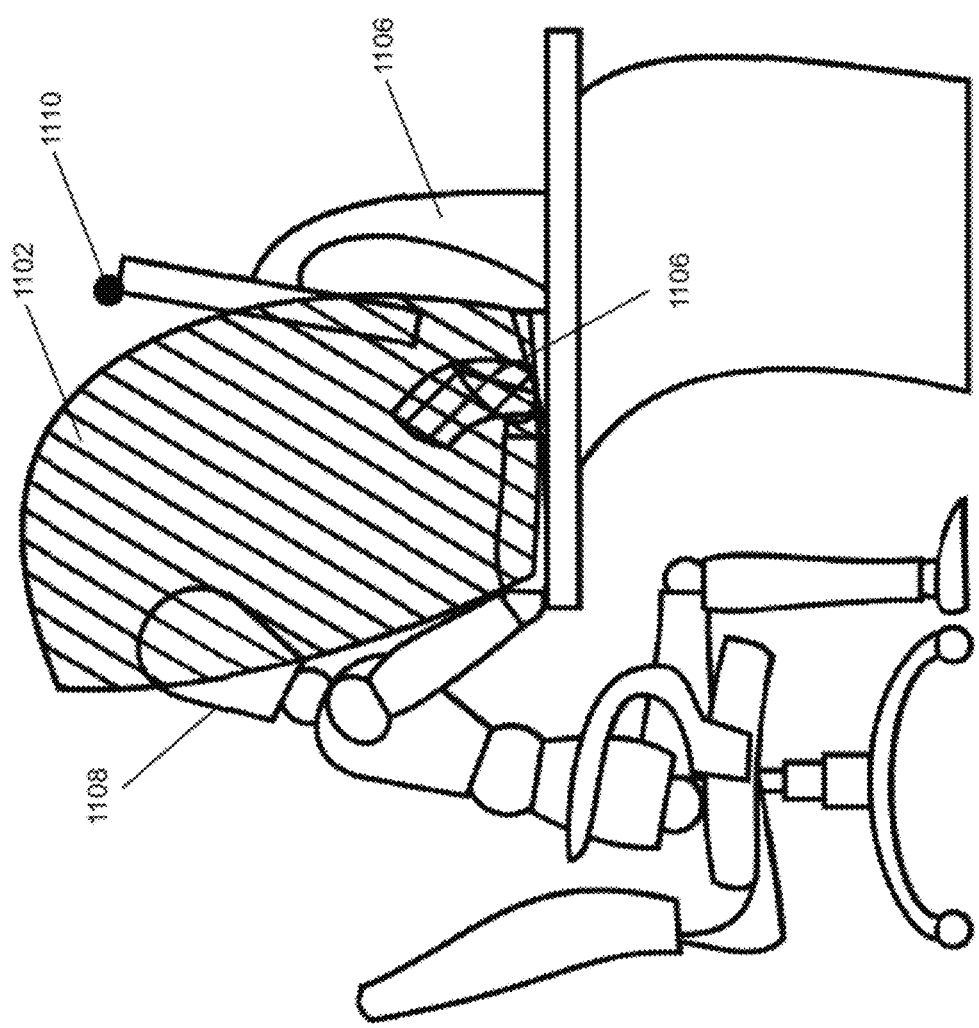
FIG. 11 is an image representing ranges of body movements for a particular position.

For example, as shown in FIG. 11, region 1102 is a general extent of the range of motion for user 1108 when operating computer 1106. Region 1102 is generally the reachable space that user 1108 can reach from the body position shown in FIG. 11—leaning forward.

Whereas a touch-free tracking system may be able to track the movement of the arms for user 1108 in the region 1102, it can be ergonomically unsound to require such movements for an extended period of time.

Also shown in FIG. 11, region 1104 that is smaller than region 1102. As it turns out, motions of the hand of user 1108 within region 1104 are much better tolerated and, therefore, more ergonomically sound. It has been found that a user is able to make motions within the range of region 1104 for extended periods of time. Indeed, to the extent that the hand for user 1108 can be generally maintained within a neutral position (e.g., curved fingers and slightly turned), substantially little stress is placed on the body and particularly the hand of user 1108.

Shown in FIG. 11 is an touch-free interface configuration according to an embodiment of the invention. As shown, computer 1106 is configured with an image detection device 1110 such as a web cam or depth camera. Computer 1106 is further configured with image processing capabilities so as to identify human body parts such as hands and arms and further track them to interpret the user's gestures. Whereas the configuration of FIG. 11 can track a wide range 1102, an embodiment of the invention provides interactive feedback to encourage the user to limit his movements within an ergonomically preferred range 1104.

Figure 12:
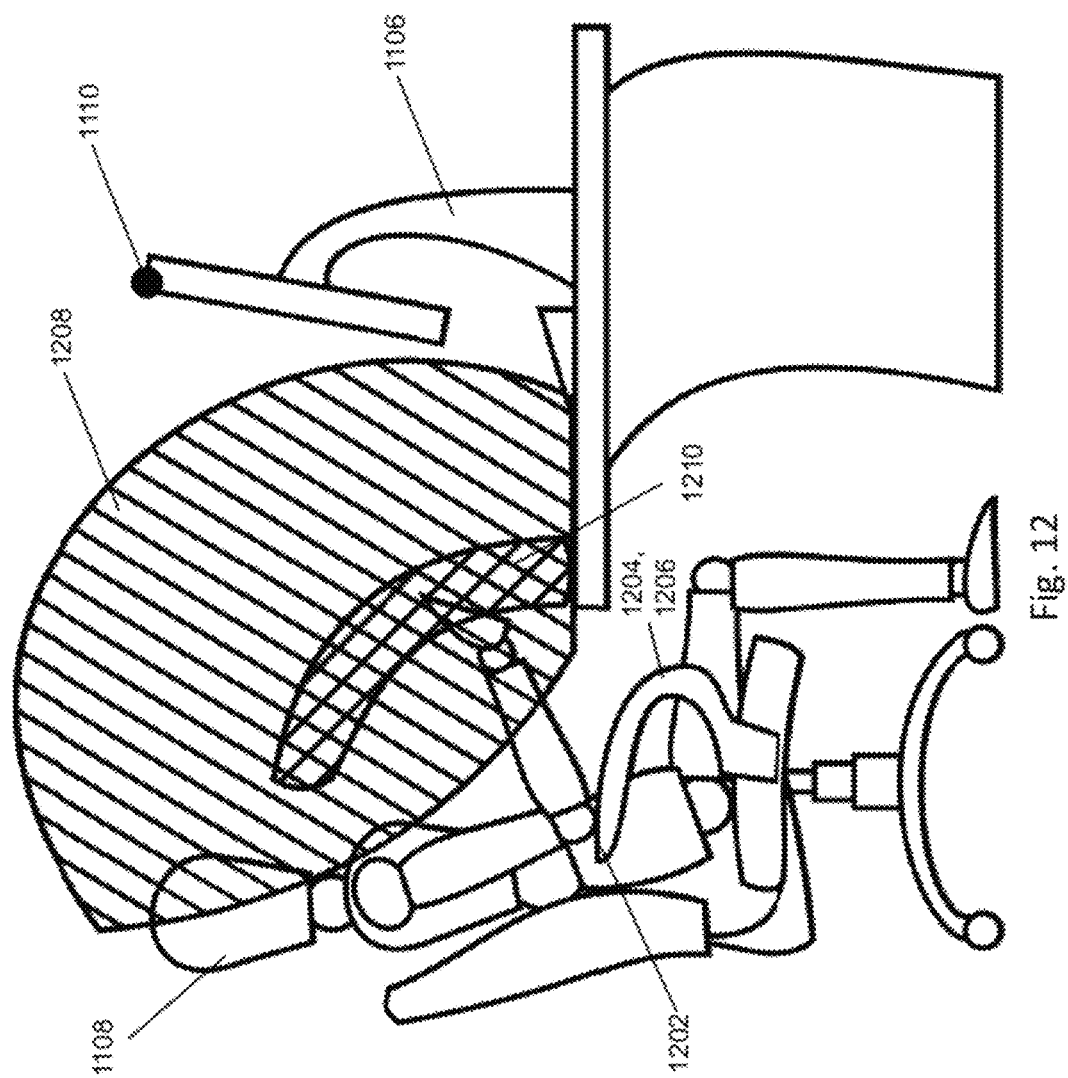
FIG. 12 is an image representing ranges of body movements for a particular position.

Shown in FIG. 12, is a different position for user 1108 where user 1108 is leaning back with his elbows 1202 on the armrest 1204 or chair 1206. As shown, region 1208 is a general extent of the range of motion for user 1108 when operating computer 1106. Region 1208 is generally the reachable space that user 1108 can reach from the body position shown in FIG. 12—leaning back.

Whereas a touch-free tracking system may be able to track the movement of the arms for user 1108 in the region 1208, it can be ergonomically unsound to require such movements for an extended period of time.

As shown in FIG. 12, user 1108 has his right arm positioned at his side. With the arms of user 1108 at his side, region 1210 is shown as a region of ergonomically sound movement where user 1108 would be able to make many repetitive motions with reduced risk of injury or pain. As shown region 1210 is smaller than region 1208. Motions of the arm and hand of user 1108 within region 1210 are much better tolerated and, therefore, more ergonomically sound. It has been found that a user is able to make motions within the range of region 1210 for extended periods of time. Indeed, to the extent that the elbow 1202 of user 1108 is placed on armrest 1204 of chair 1206, even less stress is placed on the body and repetitive motions within region 1210 are further tolerated.

Shown in FIG. 12 is an touch-free interface configuration according to an embodiment of the invention. As shown, computer 1106 is configured with an image detection device 1110 such as a web cam or depth camera. Computer 1106 is further configured with image processing capabilities so as to identify human body parts such as hands and arms and further track them to interpret the user's gestures. Whereas the configuration of FIG. 12 can track a wide range 1208, an embodiment of the invention provides interactive feedback to encourage the user to limit his movements within an ergonomically preferred range 1210.

Figure 13:
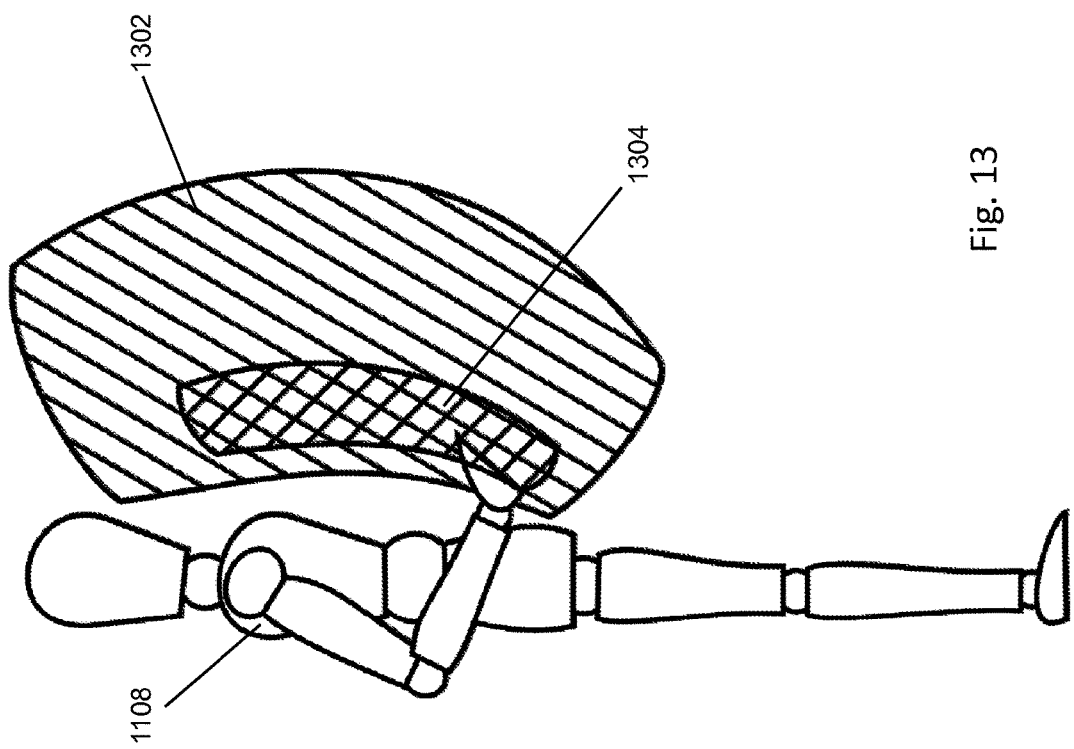
FIG. 13 is an image representing ranges of body movements for a particular position.

As will be described further below, the present invention is not limited to sitting situations. Shown in FIG. 13, is a standing position for user 1108 his elbows 1202 close to his side and slightly back. As shown, region 1302 is a general extent of the range of motion for user 1108 when operating computer 1106 (not shown). Region 1302 is generally the reachable space that user 1108 can reach from the body position shown in FIG. 12—standing up.

Whereas a touch-free tracking system may be able to track the movement of the arms for user 1108 in the region 1302, it can be ergonomically unsound to require such movements for an extended period of time.

As shown in FIG. 13, user 1108 has his right arm positioned at his side and slightly back. With the arms of user 1108 in this position, region 1304 is shown as a region of ergonomically sound movement where user 1108 would be able to make many repetitive motions with reduced risk of injury or pain. As shown region 1304 is smaller than region 1302. Motions of the arm and hand of user 1108 within region 1304 are much better tolerated and, therefore, more ergonomically sound. It has been found that a user is able to make motions within the range of region 1302 for extended periods of time.

In FIGS. 11-13 certain ergonomically preferred ranges of motion have been described for illustrative purposes. The described ranges are not intended to be strictly defined as described herein. Importantly, ergonomically preferred ranges can be varied and can differ among individuals. The significant point is that there are ergonomically preferred ranges and less preferred ranges of motion. Indeed, even for ergonomically preferred ranges of motion, repetitive stress and other injuries can still occur.

An advantage of the present invention is that a user can interface with a device such as a computer to perform a wide variety of tasks while limiting the user's motion to an ergonomically preferred range. A further advantage of the present invention is that it provides interactive feedback so as to keep a user within an ergonomically preferred range.

Figure 14:
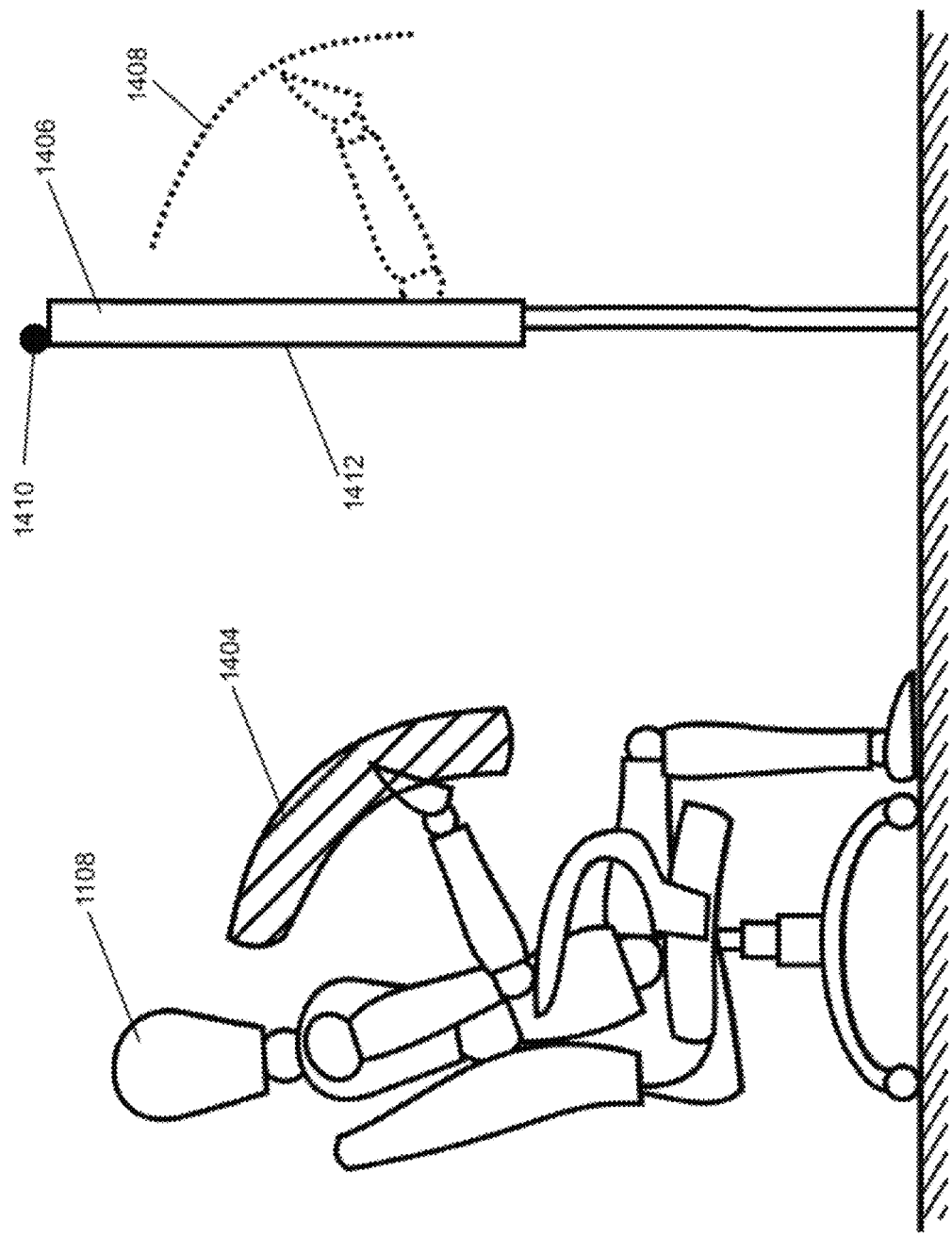
FIG. 14 is an image showing the manner in which certain body movements can be represented.

Shown in FIG. 14 is a touch-free interface configuration according to an embodiment of the invention with user 1108 sitting in a leaning back position similar to that of FIG. 12. As shown in FIG. 14, computer 1406 is configured with an image detection device 1410 such as a web cam. Computer 1406 is further configured with image processing capabilities so as to identify human body parts such as hands and arms and further track them to interpret the user's gestures. Whereas the configuration of FIG. 14 can track a wide range of motion, an embodiment of the invention provides interactive feedback to encourage the user to limit his movements within an ergonomically preferred range 1404. Among other ways, this can be achieved by providing visual cues that help the user to intuitively understand the relationship between the real-world three-dimensional range 1404 and the virtual three- or two-dimensional interface space depicted on screen 1412.

As shown in FIG. 14, the ergonomically preferred range 1404 is the real-world three dimensional space in which a user 1108 interacts. In different embodiments of the invention, the three-dimensional space of ergonomically preferred range 1404 is represented in a virtual workspace in a concrete or abstract form. For example as shown in FIG. 14, the hand and arm gestures within range 1404 are represented as directly mapped hand and arm gestures in virtual range 1408. In another embodiment, hand and arm gestures in range 1404 are mapped to a two dimensional space that represents the area of the screen 1412 of computer 1406. In this way, the hand and arm gestures within the limited range 1404 are non-linearly mapped to a two-dimensional space. Many other mappings from range 1404 are possible while keeping within the teachings of the present invention.

Figure 15:
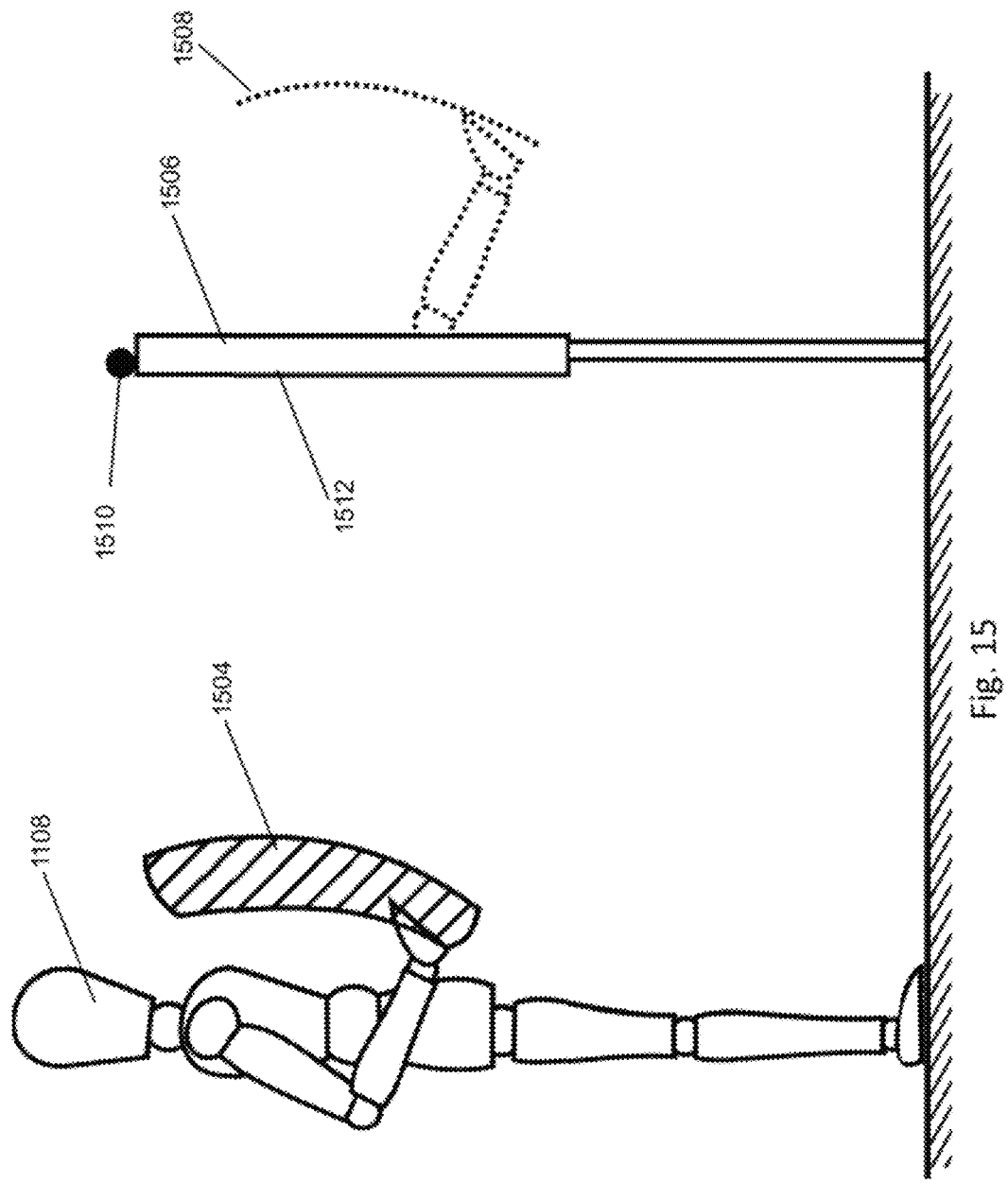
FIG. 15 is an image showing the manner in which certain body movements can be represented.

Shown in FIG. 15 is a touch-free interface configuration according to an embodiment of the invention with user 1108 in a standing position similar to that of FIG. 13. As shown in FIG. 15, computer 1506 is configured with an image detection device 1510 such as a web cam or depth camera. Computer 1506 is further configured with image processing capabilities so as to identify human body parts such as hands and arms and further track them to interpret the user's gestures. Whereas the configuration of FIG. 15 can track a wide range of motion, an embodiment of the invention provides interactive feedback to encourage the user to limit his movements within an ergonomically preferred range 1504.

As shown in FIG. 15, the ergonomically preferred range 1504 is the real-world three dimensional space in which a user 1108 interacts. In different embodiments of the invention, the three-dimensional space of ergonomically preferred range 1504 is represented in a virtual workspace in a concrete or abstract form. For example as shown in FIG. 15, the hand and arm gestures within range 1504 are represented as directly mapped hand and arm gestures in virtual range 1508. In another embodiment, hand and arm gestures in range 1504 are mapped to a two dimensional space that represents the area of the screen 1512 of computer 1506. In this way, the hand and arm gestures within the limited range 1504 are non-linearly mapped to a two-dimensional space. Many other mappings from range 1504 are possible while keeping within the teachings of the present invention.

Many other user configurations are possible without deviating from the teachings of the present invention. For example, single or multiple body parts can be tracked and mapped while keeping the body parts in ergonomically preferred positions and within ergonomically preferred ranges. Body parts that can be tracked include finger tips, fingers, hands arms, shoulders, heads, torsos, hip, feet, etc. Ergonomically preferred ranges for any of such body parts would, of course be different for each body part. Moreover, the ergonomically preferred range could vary slightly from user to user. Accordingly, an embodiment of the invention includes a manner by which to input ergonomically preferred positions and ranges. Still another embodiment of the invention, implements an adaptive algorithm that learns a user's ergonomically preferred positions and ranges.

As described above, the present invention implements a system for localizing human body parts such as hands, arms, shoulders, or even the fully body, with a processing device such as a computer along with a computer display to provide visual feedback on the display that encourages a user to maintain an ergonomically preferred position with ergonomically preferred motions. Also described above, was a system for localizing human body parts. For implementation of ergonomic touch-free interface, still other tracking systems are possible. For example, camera-based tracking systems are appropriate. Also, model driven (e.g., fitting a three-dimensional body model to observed data) as well as appearance-driven (e.g., detecting body parts in an image and inferring a topology between them) tracking systems can be used with the present invention. Hybrid models that implement a combination of tracking systems are also appropriate.

Tracking systems can be implemented systems based on iterative closest point (ICP), sampling, hypothesize-and-test, constrained optimization, sliding window, and probabilistic voting.

Figure 16:
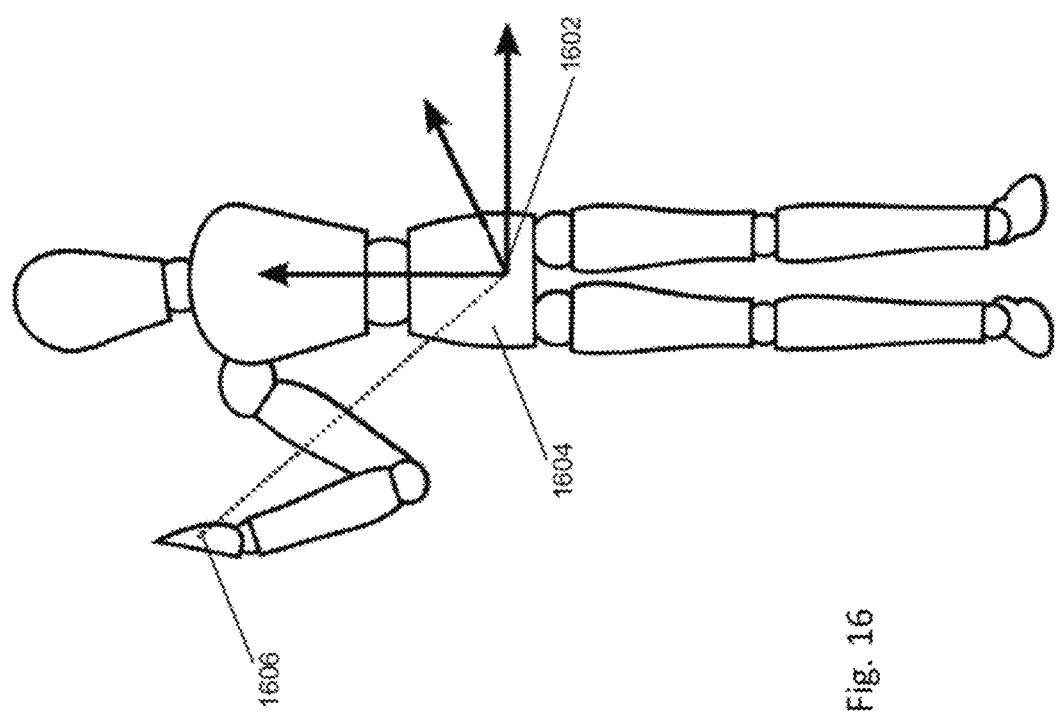
FIG. 16 is an image showing one embodiment for a reference frame.

In an embodiment of the invention, the system implements a reference frame for tacking objects, including body parts. For example as shown in FIG. 16, a three-dimensional reference frame 1602 is implemented for interpreting gestures and body motion. As shown in FIG. 16, reference frame 1602 is fixed to a user's pelvis 1604. Reference frame 1602 has an x-direction across the user's body, a y-direction vertically, and z-direction that extends away from the user's body.

In other embodiments, a reference frame can be fixed to other body parts. For example, the reference frame could be fixed to one of the user's shoulders. In another embodiment, the reference frame could be fixed at a position between a user's eyes. By being fixed to the user, the reference frame is able to follow the user as he provides gesturing input. Also, the reference frame is able to follow the user as he inadvertently moves and repositions himself to maintain his comfort or as the user performs other tasks not related to providing gesturing input to the system of the present invention.

In still another embodiment of the invention, a reference frame can be fixed in space. For example, the reference frame fixed at a position and orientation that is independent of the user.

It was mentioned previously that an embodiment of the invention provides visual cues for keeping a user's motion within an ergonomically preferred range. This can be achieved in various ways. For example, in an embodiment of the invention the touch-free user interface of the present invention reacts in the virtual space when the user provides gestures within an ergonomically preferred range, but is unresponsive or at least less responsive when the user provides gestures outside of the ergonomically preferred range. In still another embodiment of the invention, indications are provided on a computer screen to indicate whether or not a user is providing gestures within an ergonomically preferred range. For example, the screen could have a green outline or border when the user is within an ergonomically preferred range. But such outline or border would be shown in red when the user is outside of the ergonomically preferred range. In this embodiment of the invention, the touch-free user interface continues to react but provides a visual indication that the user is gesturing outside of the ergonomically preferred range.

Figure 17:
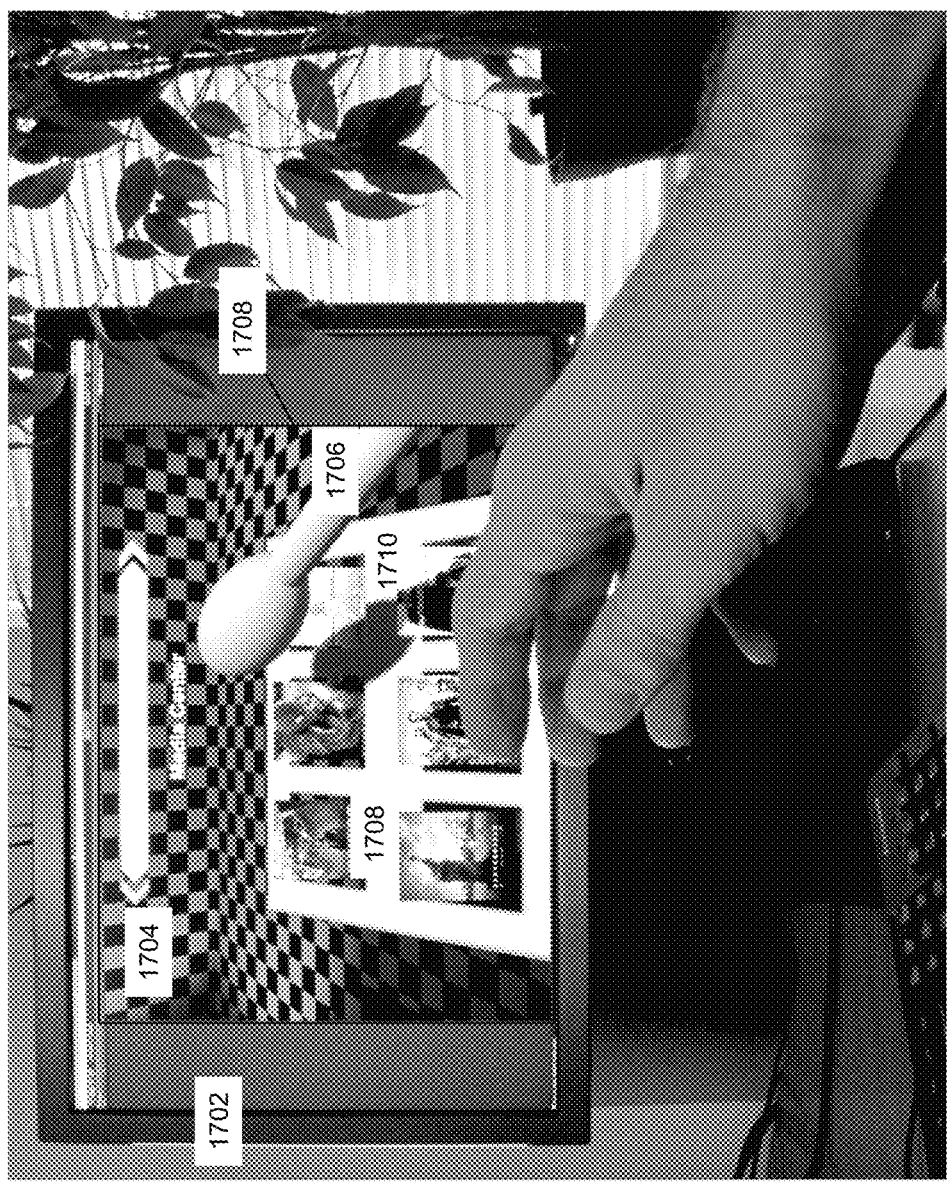
FIG. 17 is illustration of the manner of presenting visual cues according to an embodiment of the present invention.

In yet another embodiment of the invention as shown in FIG. 17, graphical elements present in the virtual workspace are designed to help the user to understand the relationship between the real-world three-dimensional range of motion and its visual representation. For example, as shown on the screen 1702 of FIG. 17, a virtual tilt is represented by providing a perspective-like texture to the display. As implemented in FIG. 17, a perspective-like grid 1704 is used to give the user an indication of the space in which he is gesturing and to provide further information as to how his movements are being interpreted. The perspective-like regular pattern of grid 1704 provides visual cues to the user about how a virtual surface is position in virtual space.

As also shown in FIG. 17, the motion of virtual objects such as cursor 1706 over movie images 1708 reveal clues about the virtual three-dimensional structure of a scene. For example, visual cues can include an indication that one object (e.g., cursor 1706) occludes an underlying object (e.g., movie images 1708). Also, shadows such as shadow 1710 can provide visual cues as to the user's actions and their role in providing input information to a computing device.

Cursor 1706 provides further visual cues by providing a virtual representation of an interaction device in the virtual workspace. This is similar to the manner in which a mouse cursor on a typical two-dimensional computer screen operates. Cursor 1706 allows the user to bring a user's attention to user interface elements, to activate such elements, to select such elements, and to manipulate or transport such elements (e.g., drag and drop).

A cursor can take on different forms such as shown in FIG. 18. For example, cursor 1802 is generally anthropomorphic as it resembles a human body part such as an arm and hand including the hand's fingers. A cursor can also be represented more abstractly such as in cursors 1804, 1806, and 1808. Cursor 1804 has much of the anthropomorphic detail removed so as to avoid any unnecessary visual distraction. Also, cursor 1808 has almost no anthropomorphic detail and can serve different purposes such as targeting objects on a screen It should be appreciated by those skilled in the art that the specific embodiments disclosed above may be readily utilized as a basis for modifying or designing other image processing algorithms or systems. It should also be appreciated by those skilled in the art that such modifications do not depart from the scope of the invention as set forth in the appended claims.

What is claimed is:
1. A human interface device, comprising:
   a stereo camera configured to receive image information for user action;
   a processor;
   a display; and
   a memory directed to store a software application;
   wherein the software application directs the processor to:
      generate depth maps from the image information received by the stereo camera;
      utilize a color-based tracking algorithm to provide real-time skin segmentation;
      localize at least one active part from the image information, wherein:
         the active part is a body part of a user; and
         the body part of the user includes fingertips;
      utilize a model-based tracking algorithm to develop a three-dimensional model of the active parts of a user's body;
      localize the fingertips of the user using a plurality of methods including:
         an optical flow algorithm;
         shape and appearance descriptor identification;
         a sliding window detector; or
         a voting-based identification algorithm;
      monitor the active part for a predetermined initiation gesture wherein the predetermined initiation gesture is the simultaneous touching of the user's left thumb to left index finger and the user's right thumb to right index finger;
activate additional options upon the use of the predetermined initiation gesture;
receive a first predetermined range of motion for the active part;
determine a second range of motion for the at least one active part, wherein the second range of motion is substantially less than the first predetermined range of motion of the at least one active part;
allowing for a manner by which to input the second range of motion by the user, and the second range of motion is chosen to allow use of the at least one active part to provide input to the device; and
generate a three-dimensional virtual workspace on the display wherein the three-dimensional virtual workspace:
represents a space including the second range of motion;
includes at least one virtual surface;
provides visual cues defining the location of the at least one virtual surface;
maps the active part onto the virtual workspace as a three-dimensional cursor containing anthropomorphic detail; and
provides a first type of response if the cursor is within the second range of motion and second type of response if the cursor is outside the second range of motion wherein the second type of response is less responsive than the first response.

2. The device of claim 1, wherein the image information includes image information from a three-dimensional sensor.

3. The device of claim 1, wherein the visual cues include textual information.

4. The device of claim 1, wherein the processor is further configured to actively learn the second range of motion.

5. The device of claim 1, wherein the processor is further configured to establish a reference frame from which the position of the at least one active part is measured.

6. The device of claim 1, wherein the processor is configured to operate in real time.

7. The device of claim 1, wherein movement of the at least one active part is mapped to a virtual space.

8. The device of claim 1, wherein the software application utilizes a template matching algorithm to localize the at least one active part.

9. The device of claim 1, wherein the software utilizes a background subtraction algorithm to localize the at least one active part.

10. The device of claim 1, wherein the software application utilizes an iterative closest point algorithm to localize the at least one active part.

11. The device of claim 1, wherein the software application utilizes a multi-hypothesis algorithm to localize the at least one active part wherein the image information is partitioned into tracks.

12. The device of claim 1, wherein the software application utilizes a second order Markov model in the color-based tracking algorithm to predict the evolution of a skin color histogram over time.

13. The device of claim 11, wherein the tracks are confined to allow for classification of tracked objects.

* * * * *